US012573229B2

(12) United States Patent
Sammoura et al.

(10) Patent No.: US 12,573,229 B2
(45) Date of Patent: Mar. 10, 2026

(54) USING TOUCH INPUT DATA TO IMPROVE FINGERPRINT SENSOR PERFORMANCE

(71) Applicant: Google LLC, Mountain View, CA (US)

(72) Inventors: Firas Sammoura, Dublin, CA (US); Alok Chandel, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/858,728

(22) PCT Filed: May 23, 2022

(86) PCT No.: PCT/US2022/072507
§ 371 (c)(1),
(2) Date: Oct. 21, 2024

(87) PCT Pub. No.: WO2023/229646
PCT Pub. Date: Nov. 30, 2023

(65) Prior Publication Data
US 2025/0285464 A1 Sep. 11, 2025

(51) Int. Cl.
*G06V 40/13* (2022.01)
*G06V 10/70* (2022.01)
(Continued)

(52) U.S. Cl.
CPC .......... *G06V 40/1335* (2022.01); *G06V 10/70* (2022.01); *G06V 40/1306* (2022.01);
(Continued)

(58) Field of Classification Search
None
See application file for complete search history.

(56) References Cited

U.S. PATENT DOCUMENTS

2013/0222331 A1* 8/2013 Kyrynyuk ............. G06F 3/0445
345/173
2016/0180145 A1 6/2016 Setterberg et al.
(Continued)

FOREIGN PATENT DOCUMENTS

WO 2022093312 A1 5/2022

OTHER PUBLICATIONS

International Search Report and Written Opinion of International Application No. PCT/US2022/072507 dated Jan. 16, 2023, 12 pp.
(Continued)

*Primary Examiner* — Joseph R Haley
(74) *Attorney, Agent, or Firm* — Shumaker & Sieffert, P.A.

(57) ABSTRACT

A computing device may detect, by a presence-sensitive display, a first touch input of a finger at a first time. While detecting the first touch input, the computing device may obtain, by a fingerprint sensor, a first portion of the fingerprint of the finger. The computing device may detect, by the presence-sensitive display, a second touch input of the finger at a second time. While detecting the second touch input, the computing device may obtain, by the fingerprint sensor, a second portion of the fingerprint of the finger. The computing device may determine a first area of the finger associated with the first portion and a second area of the finger associated with the second portion. The computing device may generate an at least partial fingerprint based on the first portion, the first area, the second portion, and the second area.

20 Claims, 8 Drawing Sheets

(51) Int. Cl.
    *G06V 40/12*         (2022.01)
    *G06V 40/50*         (2022.01)
    *G06V 40/60*         (2022.01)

(52) U.S. Cl.
    CPC .......... *G06V 40/1365* (2022.01); *G06V 40/50*
                  (2022.01); *G06V 40/67* (2022.01)

(56)            References Cited

U.S. PATENT DOCUMENTS

| | | |
|---|---|---|
| 2016/0246396 A1 | 8/2016 | Dickinson et al. |
| 2018/0114047 A1* | 4/2018 | Kim ........................ G06F 21/32 |
| 2018/0137332 A1 | 5/2018 | Andersen et al. |
| 2018/0150679 A1* | 5/2018 | Kim .................. G06V 40/1365 |
| 2018/0373917 A1 | 12/2018 | Sheik-Nainar et al. |
| 2020/0242328 A1* | 7/2020 | Chung .................. G06F 1/1684 |
| 2021/0004561 A1 | 1/2021 | Xu et al. |

OTHER PUBLICATIONS

Response to Communication Pursuant to Rules 161(1) and 162 EPC dated Jan. 9, 2025, from counterpart European Application No. 22731966.2, filed Jun. 26, 2025, 21 pp.

* cited by examiner

558B

560

558A

560

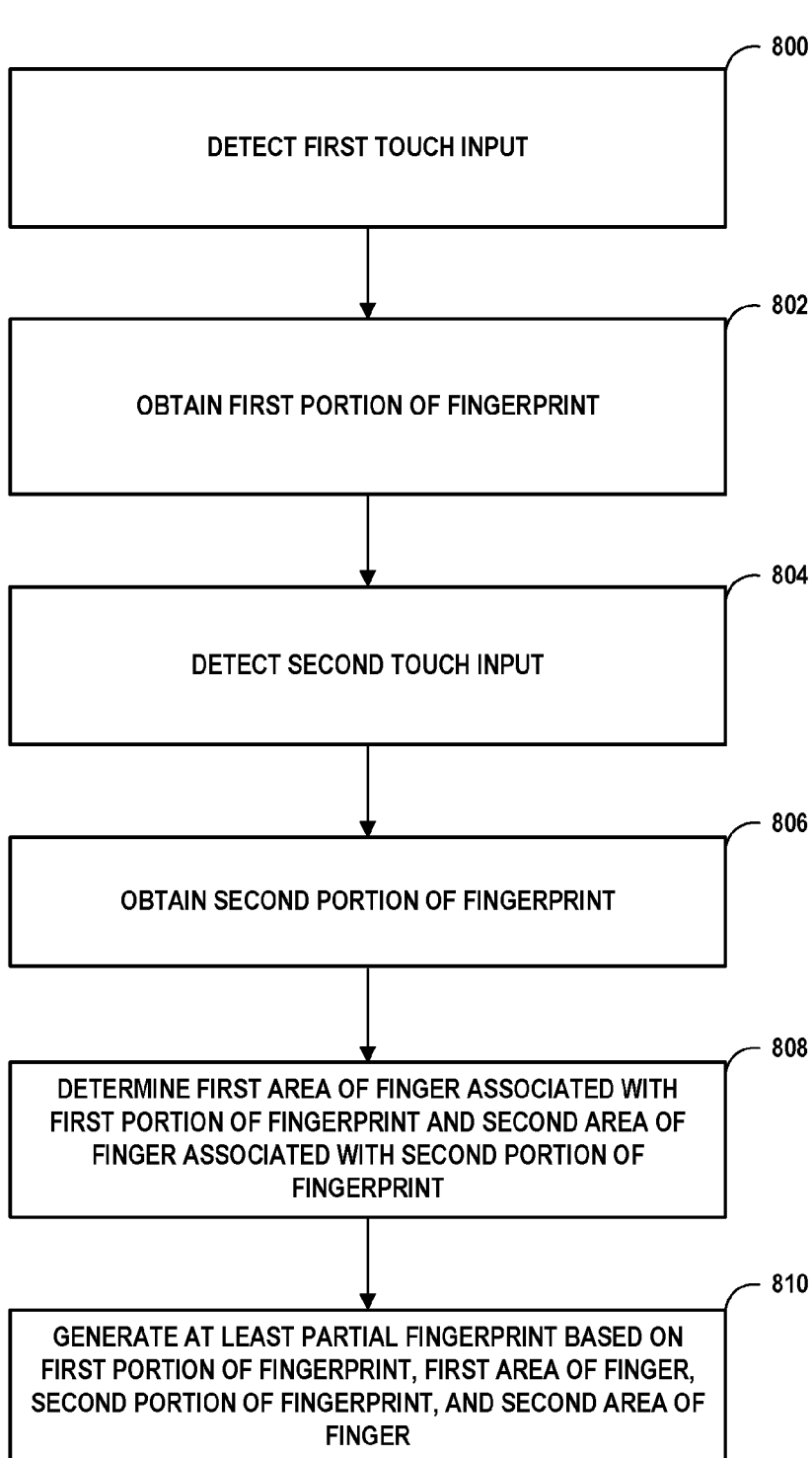

800

DETECT FIRST TOUCH INPUT

802

OBTAIN FIRST PORTION OF FINGERPRINT

804

DETECT SECOND TOUCH INPUT

806

OBTAIN SECOND PORTION OF FINGERPRINT

808

DETERMINE FIRST AREA OF FINGER ASSOCIATED WITH FIRST PORTION OF FINGERPRINT AND SECOND AREA OF FINGER ASSOCIATED WITH SECOND PORTION OF FINGERPRINT

810

GENERATE AT LEAST PARTIAL FINGERPRINT BASED ON FIRST PORTION OF FINGERPRINT, FIRST AREA OF FINGER, SECOND PORTION OF FINGERPRINT, AND SECOND AREA OF FINGER

FIG. 8

USING TOUCH INPUT DATA TO IMPROVE FINGERPRINT SENSOR PERFORMANCE

BACKGROUND

A computing device may include a touch or other presence sensor capable of detecting user input. For example, a computing device may include a presence-sensitive display capable of both displaying graphical objects and receiving user input to enable user interaction with the displayed graphical objects. Some example interactions include the user moving their finger across the presence-sensitive display to drag an object and/or cause the computing device to scroll. A computing device may also include a fingerprint sensor. In some examples, the computing device may require that a user place the user's finger at the fingerprint sensor as part of a fingerprint authentication process.

SUMMARY

A computing device may use touch input data (e.g., coordinates of a touch input a set of heatmaps associated with the touch input, etc.) generated by a touch sensor and fingerprint data (e.g., one or more images) generated by a fingerprint sensor to generate an at least partial fingerprint of a finger of a user. For instance, the computing device may use the touch input data to determine the areas (e.g., locations, spots, regions, etc.) of the finger associated with the portions of the fingerprint captured by the fingerprint sensor. Based on the respective area of each portion of the fingerprint captured by the fingerprint sensor, the computing device may align (e.g., combine, stitch, etc.) the portions of the user's fingerprint when generating the at least partial fingerprint. Thus, a fingerprint enrollment operation that uses the at least partial fingerprint determined in accordance with techniques of this disclosure may be superior in terms of accuracy, quality, speed, etc.

In one example, a method includes detecting, by a presence-sensitive display of a computing device, a first touch input of a finger at a first time; while detecting the first touch input, obtaining, by a fingerprint sensor of the computing device, a first portion of a fingerprint of the finger, wherein the fingerprint sensor is configured to obtain the fingerprint through the presence-sensitive display; detecting, by the presence-sensitive display, a second touch input of the finger at a second time; while detecting the second touch input, obtaining, by the fingerprint sensor, a second portion of the fingerprint of the finger; determining, by the computing device, a first area of the finger associated with the first portion of the fingerprint and a second area of the finger associated with the second portion of the fingerprint; and generating, by the computing device, an at least partial fingerprint of the finger based on the first portion of the fingerprint, the first area of the finger, the second portion of the fingerprint, and the second area of the finger.

In another example, a computing device includes a presence-sensitive display configured to detect touch input; a fingerprint sensor configured to obtain a fingerprint of a finger through the presence-sensitive display; one or more processors; and a memory that stores instructions that, when executed by the one or more processors, cause the one or more processors to: receive, from the presence-sensitive display, a first touch input of a finger at a first time; while the presence-sensitive display is detecting the first touch input, receive, from the fingerprint sensor, a first portion of the fingerprint of the finger; receive, from the presence-sensitive display, a second touch input of the finger at a second time;

while the presence-sensitive display is detecting the second touch input, receive, from the fingerprint sensor, a second portion of the fingerprint of the finger; determine a first area of the finger associated with the first portion of the fingerprint and a second area of the finger associated with the second portion of the fingerprint; and generate an at least partial fingerprint of the finger based on the first portion of the fingerprint, the first area of the finger, the second portion of the fingerprint, and the second area of the finger.

In another example, a non-transitory computer-readable storage medium is encoded with instructions that, when executed by one or more processors of a computing device, cause the one or more processors to: a presence-sensitive display configured to detect touch input; a fingerprint sensor configured to obtain a fingerprint of a finger through the presence-sensitive display; one or more processors; and a memory that stores instructions that, when executed by the one or more processors, cause the one or more processors to: receive, from the presence-sensitive display, a first touch input of a finger at a first time; while the presence-sensitive display is detecting the first touch input, receive, from the fingerprint sensor, a first portion of the fingerprint of the finger; receive, from the presence-sensitive display, a second touch input of the finger at a second time; while the presence-sensitive display is detecting the second touch input, receive, from the fingerprint sensor, a second portion of the fingerprint of the finger; determine a first area of the finger associated with the first portion of the fingerprint and a second area of the finger associated with the second portion of the fingerprint; and generate an at least partial fingerprint of the finger based on the first portion of the fingerprint, the first area of the finger, the second portion of the fingerprint, and the second area of the finger.

In another example, a computing device includes: means for detecting a first touch input of a finger at a first time; means for obtaining a first portion of a fingerprint of the finger while detecting the first touch input; means for detecting a second touch input of the finger at a second time; means for obtaining a second portion of the fingerprint of the finger while detecting the second touch input; means for determining a first area of the finger associated with the first portion of the fingerprint and a second area of the finger associated with the second portion of the fingerprint; and means for generating an at least partial fingerprint of the finger based on the first portion of the fingerprint, the first area of the finger, the second portion of the fingerprint, and the second area of the finger.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 8 is a flowchart illustrating example operations of an example computing device in accordance with one or more aspects of the present disclosure.

DETAILED DESCRIPTION

Figure 1:
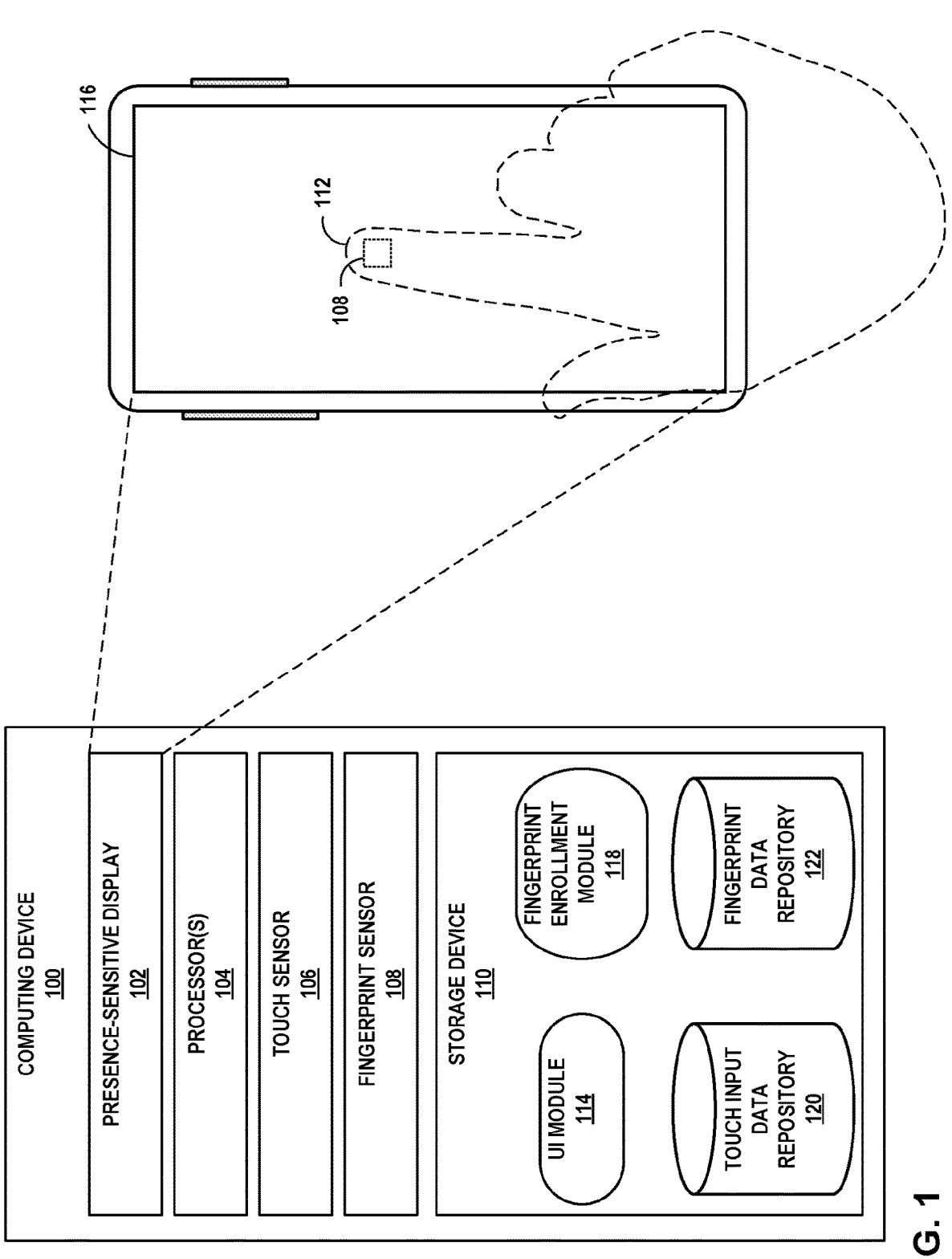
FIG. 1 is a conceptual diagram illustrating an example computing device including a presence-sensitive display in accordance with one or more aspects of the present disclosure.

FIG. 1 is a conceptual diagram illustrating an example computing device 100. FIG. 1 illustrates only one particular example of computing device 100 and many other examples of computing device 100 may be used in other instances. In the example of FIG. 1, computing device 100 may be a wearable computing device, a mobile computing device, or any other computing device capable of receiving user input. Computing device 100 may include a subset of the components included in example computing device 100 of FIG. 1 or may include additional components not shown in FIG. 1.

In the example of FIG. 1, computing device 100 may be a mobile phone, such as a smartphone. However, computing device 100 may also be any other type of computing device such as a camera device, a tablet computer, a personal digital assistant (PDA), a smart speaker, a laptop computer, a desktop computer, a gaming system, a media player, an e-book reader, a television platform, an automobile navigation system, or a wearable computing device (e.g., a computerized watch). As shown in FIG. 1, computing device 100 includes one or more presence-sensitive displays 102 ("presence-sensitive display 102"), one or more processors 104 ("processor 104"), one or more touch sensors 106 ("touch sensor 106"), one or more fingerprint sensors 108 ("fingerprint sensor 108"), and one or more storage devices 110 ("storage device 110").

Presence-sensitive display 102 may function as a respective input and/or output device for computing device 100. Presence-sensitive display 102 may be implemented using various technologies. For instance, presence-sensitive display 102 may function as an input device using a presence-sensitive input screen, such as a capacitive touchscreen or projective capacitance touchscreen. Presence-sensitive display 102 may also function as an output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 100. In the example of FIG. 1, presence-sensitive display 102 may be a presence-sensitive display capable of both receiving user input and displaying graphical data.

Presence-sensitive display 102 may allow one or more sensors to operate underneath presence-sensitive display 102. For instance, sensor signals and other external signals may pass-through various layers of the presence-sensitive display 102 (making presence-sensitive display a "pass-through display"). To facilitate the pass-through nature of presence-sensitive display 102, various back coverings on presence-sensitive display 102 may be omitted during construction of presence-sensitive display 102 at locations above and/or adjacent to a location of fingerprint sensor 108 under presence-sensitive display 102. For example, presence-sensitive display 102 may include a back cover formed from foam (or other types of cushions) and copper (Cu) films that are removed in areas of the back cover above and/or adjacent to a location of fingerprint sensor 108. The omission of the back cover may allow the sensor signals and other external signals (e.g., light reflecting off a user's finger) to pass through presence-sensitive display 102.

Presence-sensitive display 102 may detect input (e.g., touch and non-touch input) from a user of respective computing device 100. For instance, presence-sensitive display 102 may detect indications of input by detecting one or more gestures from a user (e.g., the user touching, pointing, and/or swiping at or near one or more locations of presence-sensitive display 102 with a finger, stylus pen, or another user input element). Presence-sensitive display 102 may output information to a user in the form of a user interface, which may be associated with functionality provided by computing device 100. Such user interfaces may be associated with computing platforms, operating systems, applications, and/or services executing at or accessible from computing device 100 (e.g., electronic message applications, chat applications, Internet browser applications, mobile or desktop operating systems, social media applications, electronic games, menus, and other types of applications).

Processor 104 may implement functionality and/or execute instructions within computing device 100. Examples of processor 104 include, but are not limited to, one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein.

Computing device 100 may include touch sensor 106 (e.g., a capacitive touch sensor). Touch sensor 106 may be constructed from a matrix of row and column electrodes on either side of a dielectric material. The electrodes of touch sensor 106 may be connected to a touch controller that can both drive the electrodes with a voltage signal and sense resultant changes in capacitance. When an electrode is driven with a voltage signal, the electrode's inherent capacitance to other objects (such as a human finger, another electrode, or ground) can be measured.

Computing device 100 may detect, based on the measured capacitance of the electrodes of touch sensor 106, one or more touch inputs 112 (e.g., a tap, press, slide, swipe, etc.) at presence-sensitive display 102. For example, touch sensor 106 may sense touch inputs 112 at a plurality of touch sensor cells, and may generate a corresponding capacitance value at each touch sensor cell that senses touch inputs 112. Touch sensor 106 may generate touch input data based on the location of each of the touch sensor cells that senses touch inputs 112 and the corresponding capacitance value of each of the touch sensor cells. The touch input data may be stored in a touch input data repository 120.

In general, the capacitance value of each touch sensor cell may change in response to pressure exerted by a touch element on presence-sensitive display 102, such as a finger.

For example, higher pressure may correlate to higher capacitance values, and lower pressure may correlate to lower capacitance values.

In some examples, the touch input data may include a sequence of indications of capacitance ("capacitance indications"). The capacitance indications may represent the capacitance reflective of touch inputs 112 detected at presence-sensitive display 102 at various times (e.g., a first time, a second time, a third time, etc.). The capacitance indications may define capacitance for each point of a two-dimensional grid of presence-sensitive display 102 (thereby defining what may be referred to as a "heatmap" or a "capacitive heatmap"). Thus, computing device 100 may determine a plurality of heatmaps based on touch input data associated with touch inputs 112 and generated by touch sensor 106. The heatmaps may include indications of capacitance in a region of presence-sensitive display 102.

Computing device 100 may include fingerprint sensor 108. Fingerprint sensor 108 may be positioned underneath one or more layers of presence-sensitive display 102, such as a touchscreen layer (that includes touch sensor 106) of presence-sensitive display 102. In other words, fingerprint sensor 108 may be positioned within one or more of various layers of presence-sensitive display 102. Fingerprint sensor 108 may be configured to sense a fingerprint through presence-sensitive display 102. Fingerprint sensor 108 may utilize light emitted by pixels of presence-sensitive display 102 that overlie fingerprint sensor 108 to sense fingerprints (e.g., the sensor may detect light reflected by a user's finger in contact with, or proximate to, presence-sensitive display 102). Examples of fingerprint sensor 108 include an under-display fingerprint sensor (UDFS) and a through-display sensor.

By sensing a fingerprint through presence-sensitive display 102, fingerprint sensor 108 may generate fingerprint data representative of a portion of the finger positioned at fingerprint sensor 108. For example, fingerprint sensor 108 may be configured to obtain an image of at least a portion of a user's fingerprint. The fingerprint data may be stored in a fingerprint data repository 122.

Fingerprint sensor 108 may be located at a portion of computing device 100, such as a front portion, a back portion that is opposite from the front portion, and/or one or more side portions. In various examples, fingerprint sensor 108 may be provided on the front portion of computing device 100 (e.g., underneath presence-sensitive display 102) and on one or more side portions of computing device 100 (e.g., as part of a solid-state button). In other examples, fingerprint sensor 108 is provided on the back portion of computing device 100. In the example of FIG. 1, fingerprint sensor 108 is provided on the front portion of computing device 100 and underneath one or more layers of presence-sensitive display 102.

Storage device 110 may include one or more computer-readable storage media. For example, storage device 110 may be configured for long-term, as well as short-term storage of information, such as instructions, data, or other information used by computing device 100. In some examples, storage device 110 may include non-volatile storage elements. Examples of such non-volatile storage elements include magnetic hard disks, optical discs, solid state discs, and/or the like. In other examples, in place of, or in addition to the non-volatile storage elements, storage device 110 may include one or more so-called "temporary" memory devices, meaning that a primary purpose of these devices may not be long-term data storage. For example, the devices may comprise volatile memory devices, meaning that the devices may not maintain stored contents when the devices are not receiving power. Examples of volatile memory devices include random-access memories (RAM), dynamic random-access memories (DRAM), static random-access memories (SRAM), etc.

Storage device 110 may include one or more modules. For example, storage device 110 may include a user interface module 114 ("UI module 114"). UI module 114 may manage user interactions with presence-sensitive display 102 and other components of computing device 100. For example, UI module 114 may output a user interface and may cause presence-sensitive display 102 to display the user interface as a user of computing device 100 views output and/or provides input at presence-sensitive display 102. In the example of FIG. 1, UI module 114 may interface with presence-sensitive display 102 to present a user interface 116 ("UI 116").

UI module 114 may act as an intermediary between various components of computing device 100 to make determinations based on touch inputs 112 detected by presence-sensitive display 102 and generate output at presence-sensitive display 102 in response to touch inputs 112. UI module 114 may receive instructions from an application, service, platform, or other module of computing device 100 to cause presence-sensitive display 102 to output a user interface, such a UI 116.

UI module 114 may process inputs detected at presence-sensitive display 102 and may relay information about the detected inputs, such as touch inputs 112, to one or more associated platforms, operating systems, and/or services executing at computing device 100, for example, to cause computing device 100 to perform operations. For example, UI module 114 may manage touch inputs 112 received by computing device 100 as a user views and interacts with UI 116 presented at presence-sensitive display 102 and may update UI 116 in response to receiving additional instructions from the application, service, platform, or other module of computing device 100 that is processing touch inputs 112.

Although shown separate from presence-sensitive display 102, UI module 114 may be integrated within presence-sensitive display 102. In other words, presence-sensitive display 102 may implement the functionality described with respect to UI module 114, either in hardware, or a combination of hardware and software.

In general, computing device 100 may require that a user place the user's finger at fingerprint sensor 108 to authenticate the user before allowing the user to unlock or otherwise access applications provided by computing device 100. Before computing device 100 can perform a fingerprint authentication operation, computing device 100 may need to perform a fingerprint enrollment operation in which computing device 100 obtains and stores one or more reference fingerprints of the user. For example, computing device 100 may enroll a user's fingerprint by capturing, via fingerprint sensor 108, one or more images of the user's fingerprint when the user's finger is positioned (and, if required by the procedures of a fingerprint enrollment phase, repositioned) at fingerprint sensor 108. However, in examples, fingerprint sensor 108 may be relatively small (e.g., about 1 centimeter (cm) by 1 cm). As a result, fingerprint sensor 108 may only be able to capture an image of at most a portion of the user's fingerprint at any given time. Accordingly, computing device 100 may not accurately and/or completely determine the user's fingerprint based on the fingerprint data generated by fingerprint sensor 108, which may result in inaccurate and/or incomplete fingerprint enrollment. Inaccurate and/or incomplete fingerprint enrollment may adversely affect the performance of fingerprint authentication operations.

In accordance with techniques of this disclosure, computing device 100 may use touch input data and fingerprint data to generate an at least partial fingerprint of a finger of a user of computing device 100. By determining a partial fingerprint in accordance with techniques of this disclosure, computing device 100 may generate a more accurate representation of a fingerprint. For instance, the techniques may enable computing device 100 to more precisely align (e.g., combine, stitch, etc.) images of portions of the user's fingerprint when determining the at least partial fingerprint. Thus, a fingerprint enrollment operation that generates an at least partial fingerprint determined in accordance with techniques of this disclosure may be superior in terms of accuracy and quality.

A fingerprint enrollment module 118 of computing device 100 may execute a fingerprint enrollment operation that uses touch input data generated by touch sensor 106 and fingerprint data generated by fingerprint sensor 108 to generate a partial fingerprint. The touch input data may be indicative of touch inputs 112 detected at presence-sensitive display 102 at various times. For instance, presence-sensitive display 102 may detect (e.g., via touch sensor 106) a first touch input of touch inputs 112 provided by a finger of a user at a first time. Responsive to presence-sensitive display 102 detecting the first touch input, touch sensor 106 may generate, and fingerprint enrollment module 118 may obtain (e.g., receive), a first set of touch input data indicative of the first touch input.

In some examples, fingerprint enrollment module 118 may determine heatmaps associated with the touch inputs. For example, fingerprint enrollment module 118 may determine a first set of heatmaps associated with the first touch input based on the first set of touch input data. Fingerprint enrollment module 118 may process heatmaps, such as the first set of heatmaps, to determine parameters of the touch inputs, such as the pressure, velocity, etc., of the touch inputs. The first set of heatmaps may include one or more indications of capacitance values for a first region of presence-sensitive display 102.

Fingerprint enrollment module 118 may obtain fingerprint data (e.g., an image) generated by fingerprint sensor 108. For example, while detecting the first touch input, fingerprint sensor 108 (and in turn fingerprint enrollment module 118) may obtain a first portion of a fingerprint of the finger. The first portion of the fingerprint of the finger may be a first set of fingerprint data (e.g., an image) generated by fingerprint sensor 108 that is representative of the portion of the finger positioned at fingerprint sensor 108 at the first time. The first portion of the fingerprint may be any portion of the fingerprint, such as a center portion, top portion, bottom portion, edge portion, etc.

In some examples, fingerprint sensor 108 may obtain the first portion of the fingerprint in response to fingerprint enrollment module 118 determining, based on the first set of heatmaps associated with the first touch input, that at least one parameter of the first touch input detected at presence-sensitive display 102 at the first time has stabilized (e.g., remained within a predetermined range of values for a predetermined amount of time). The at least one parameter of the first touch input (and any of touch inputs 112) may include a pressure exerted by the finger on presence-sensitive display 102, a velocity of the finger, a shape of a contacting area (i.e., the area of the finger contacting presence-sensitive display 102) of the finger, or a size of the contacting area of the finger.

As noted above, fingerprint sensor 108 may be relatively small compared to the size of the fingerprint of the finger such that fingerprint sensor 108 cannot capture an image or otherwise generate fingerprint data representative of the entirety of the fingerprint from just one touch input. As a result, for fingerprint enrollment module 118 to enroll a sufficient area of the fingerprint for purposes of enrollment, the user may need to reposition the finger on presence-sensitive display 102 such that a portion of the finger different from the first portion of the finger is positioned at fingerprint sensor 108, enabling fingerprint sensor 108 to obtain the remaining, uncaptured portions of the fingerprint.

After providing the first touch input, the user may provide a second touch input of touch inputs 112 via presence-sensitive display 102. In some examples, the user may provide the second touch input by lifting the finger off from presence-sensitive display 102 and touching presence-sensitive display 102 at a second time such that a second portion of the finger is positioned at fingerprint sensor 108. Alternatively, instead of lifting the finger off from presence-sensitive display 102, the user may slide the finger on presence-sensitive display 102 such that a second portion of the finger is positioned at fingerprint sensor 108.

In any case, presence-sensitive display 102 may detect the second touch input of touch inputs 112 provided by a finger of a user at the second time. Responsive to presence-sensitive display 102 detecting the second touch input, touch sensor 106 may generate, and fingerprint enrollment module 118 may obtain, a second set of touch input data indicative of the second touch input. Fingerprint enrollment module 118 may further determine a second set of heatmaps associated with the second touch input based on the second set of touch input data. The second set of heatmaps may include one or more indications of capacitance values for a second region of presence-sensitive display 102.

While detecting the second touch input, fingerprint sensor 108 (and in turn fingerprint enrollment module 118) may obtain a second portion of the fingerprint of the finger. The second portion may be a second set of fingerprint data (e.g., an image) representative of the portion of the finger positioned at fingerprint sensor 108 at the second time. The second portion of the finger may be any portion of the fingerprint, such as a center portion, top portion, bottom portion, edge portion, etc.

In some examples, fingerprint sensor 108 may obtain the second set of fingerprint data in response to fingerprint enrollment module 118 determining, based on the second set of heatmaps associated with the second touch input, that at least one parameter of the second touch input detected at presence-sensitive display 102 at the second time has stabilized (e.g., remained within a predetermined range of values for a predetermined amount of time). The at least one parameter of the second touch input may include a pressure exerted by the finger on presence-sensitive display 102, a velocity of the finger, a shape of a contacting area (i.e., the area of the finger contacting presence-sensitive display 102) of the finger, or a size of the contacting area of the finger.

The second portion of the finger is preferably a different portion of the finger than the first portion of the finger (e.g., to ensure that fingerprint enrollment module 118 obtains fingerprint data for uncaptured portions of the fingerprint). However, the techniques of this disclosure may still apply when the second portion of the finger is substantially similar to the first portion of the finger.

For each captured portion of the fingerprint, fingerprint enrollment module 118 may determine an area (e.g., location, spot, region, coordinate, position, etc.) of the finger associated with the portion. For instance, fingerprint enrollment module 118 may determine a first area of the finger associated with the first portion of the fingerprint and a second area of the finger associated with the second portion of the fingerprint. In some examples, fingerprint enrollment module 118 may determine the first area of the finger associated with the first portion of the fingerprint based on the first set of heatmaps. Similarly, fingerprint enrollment module 118 may determine the second area of the finger associated with the second portion of the fingerprint based on the second set of heatmaps.

The first set of heatmaps may indicate (e.g., based on the capacitance values), during the first touch input, a first finger position of the finger. As used herein, finger position refers to the position (e.g., [x, y] coordinates) of the area of the finger in contact with presence-sensitive display 102 relative to presence-sensitive display 102. Additionally, based on the first set of heatmaps, fingerprint enrollment module 118 may determine, for example, the centroid of the contacting area, the shape of the contacting area, an approximation of the shape of the contacting area (such as an ellipse), the size of the contacting area, etc. In cases where the user is firmly (and flatly) pressing the finger onto presence-sensitive display 102, the contacting area may include a substantial portion, if not all, of the fingerprint of the finger.

Fingerprint enrollment module 118 may have access to information about the position (e.g., [x, y] coordinates) of fingerprint sensor 108 relative to presence-sensitive display 102. Thus, fingerprint enrollment module 118 may determine, based on the position of fingerprint sensor 108 relative to presence-sensitive display 102 and the first finger position of the finger (which may additionally include information such as the centroid of the contacting area, the shape of the contacting area, an approximation of the shape of the contacting area, the size of the contacting area, etc.), the first area of the finger associated with the first portion. For instance, if fingerprint enrollment module 118 determines, based on the first set of heatmaps, that the centroid of the contacting area is positioned at fingerprint sensor 108, fingerprint enrollment module 118 may determine the first area of the finger to be the centroid of the fingerprint (e.g., located at the center portion of the fingerprint).

Fingerprint enrollment module 118 may determine a second area of the finger associated with the second portion of the fingerprint in a similar manner. That is, fingerprint enrollment module 118 may determine the second area of the finger based on a second set of heatmaps associated with the second touch input. For instance, if fingerprint enrollment module 118 determines, based on the second set of heatmaps, that a left edge of the contacting area is positioned at fingerprint sensor 108, fingerprint enrollment module 118 may determine the second area of the finger to be the left edge of the fingerprint (e.g., located at the left portion of the fingerprint).

Fingerprint enrollment module 118 may generate an at least partial fingerprint based on the first portion of the fingerprint, the first area of the finger, the second portion of the fingerprint, and the second area of the finger. For instance (and as shown in FIGS. 6A-6D), fingerprint enrollment module 118 may align the first portion of the fingerprint and the second portion of the fingerprint based on the first area of the finger and the second area of the finger. Thus, using the examples above, fingerprint enrollment module 118 may combine the first portion and second portion to generate an at least partial fingerprint including a center portion of the fingerprint and a left portion of the fingerprint. Further, the center portion and the left portion may be positioned relative to each other to accurately correspond to the fingerprint of the user. It is noted that the techniques of this disclosure do not require that the first portion and the second portion be adjacent or contiguous portions of the fingerprint to align the first set of fingerprint data and the second set of fingerprint data. That is, the first portion and the second portion may be noncontiguous portions of the finger.

Fingerprint enrollment module 118 may enroll the fingerprint of the finger of the user based on the at least partial fingerprint. For example, responsive to the partial fingerprint including a sufficient portion of the fingerprint, fingerprint enrollment module 118 may complete a fingerprint enrollment operation. A sufficient portion of the fingerprint may be any percentage of the fingerprint, such as 75%, 85%, 95%, etc. In any case, fingerprint enrollment module 118 may store (e.g., in fingerprint data repository 122) the partial fingerprint for (future) fingerprint authentication attempts.

Although touch inputs 112 are described as including a first touch input and a second touch input, a person of ordinary skill should understand that touch inputs 112 may include one or more additional touch inputs (e.g., a third touch input, a fourth touch input, etc.). In such examples, the techniques of this disclosure may be similarly applied to the one or more additional touch inputs in order to ensure that a sufficient portion of the fingerprint has been enrolled (e.g., because just the first portion and the second portion are insufficient for completing a fingerprint enrollment operation). In addition, the techniques of this disclosure may be applied to one or more fingers, one or more bands, and one or more users.

Figure 2:
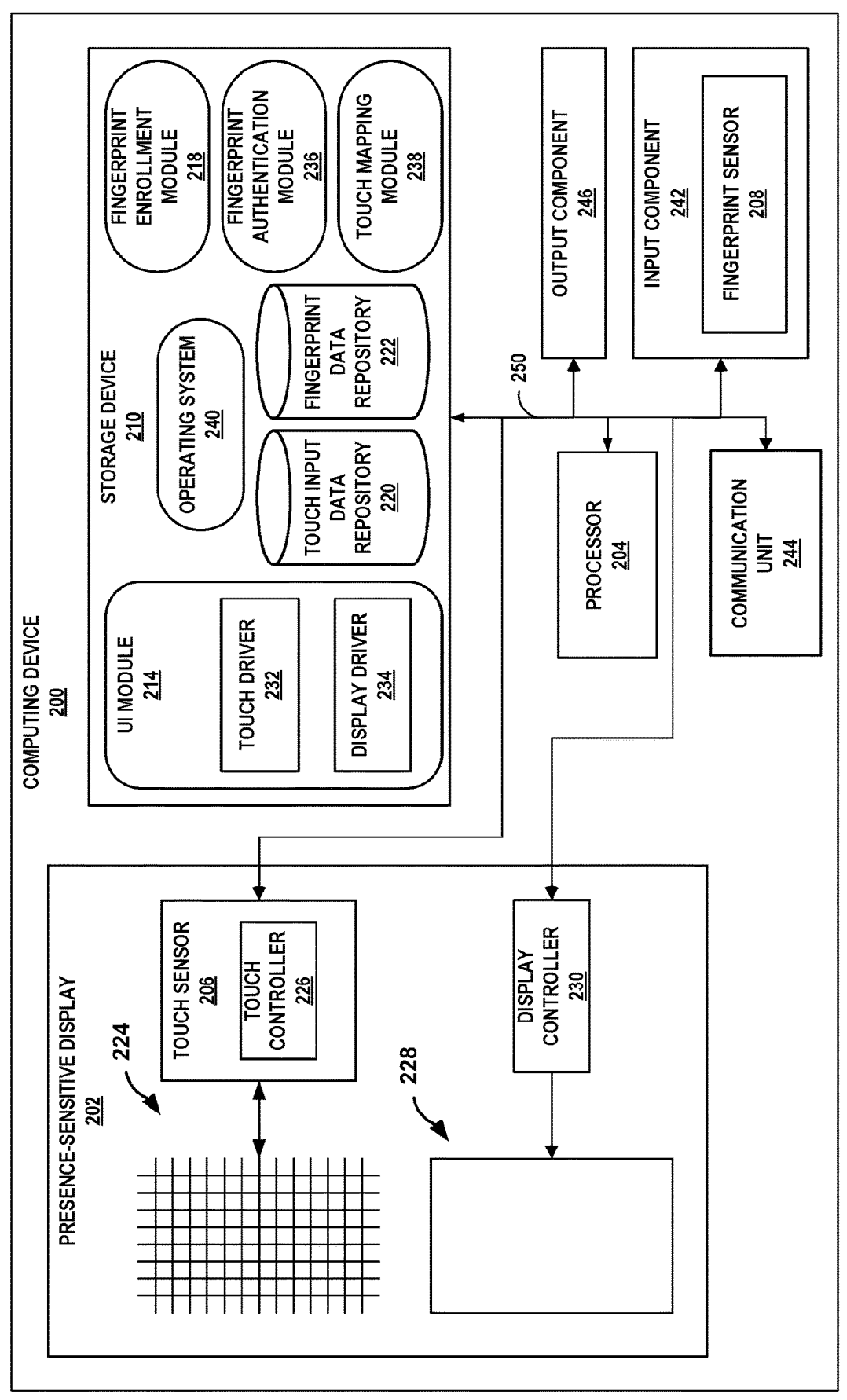
FIG. 2 is a block diagram illustrating further details of a computing device that performs fingerprint enrollment in accordance with one or more techniques of this disclosure.

FIG. 2 is a block diagram illustrating further details of a computing device 200 that performs fingerprint enrollment in accordance with one or more techniques of this disclosure. Computing device 200 of FIG. 2 is described below as an example of computing device 100 illustrated in FIG. 1. FIG. 2 illustrates only one particular example of computing device 200, and many other examples of computing device 200 may be used in other instances and may include a subset of the components included in example computing device 200 or may include additional components not shown in FIG. 2.

As shown in FIG. 2, computing device 200 may include one or more presence-sensitive displays 202 ("presence-sensitive display 202"), one or more processors 204 ("processor 204"), one or more input components 242 ("input component 242"), one or more communication units 244 ("communication unit 244"), one or more output components 246 (output component 246"), and one or more storage devices 210 ("storage device 210"). Presence-sensitive display 202 may include one or more touch sensors 206 ("touch sensor 206"), electrodes 224, one or more display panels 228 ("display panel 228"), and one or more display controllers 230 ("display controller 230"). As also shown in FIG. 2, storage device 210 may include a user interface module 214 ("UI module 214"), a fingerprint enrollment module 218, a touch input data repository 220, a fingerprint data repository 222, a fingerprint authentication module 236, a touch mapping module 238, and an operating system 240 ("OS 240").

Communication channels 250 may interconnect each of the components 202, 204, 210, 242, 244, and 246 for inter-component communications (physically, communicatively, and/or operatively). In some examples, communication channels 250 may include a system bus, a network connection, an inter-process communication data structure, or any other method for communicating data.

Input component 242 of computing device 200 may receive input. Examples of input are tactile, audio, and video input. Input component 242 of computing device 200, in one example, includes a presence-sensitive display, such as presence-sensitive display 202, a fingerprint sensor, such as fingerprint sensor 208, touch-sensitive screen, mouse, keyboard, voice responsive system, video camera, microphone or any other type of device for detecting input from a human or machine. As discussed above, fingerprint sensor 208 may be a UDFS, a through-display sensor, etc. For example, fingerprint sensor 208 may be positioned underneath one or more layers of presence-sensitive display 202. Fingerprint sensor 208 may be configured to sense a fingerprint through presence-sensitive display 202.

Input component 242 may include one or more sensors. Numerous examples of sensors exist and include any input component configured to obtain environmental information about the circumstances surrounding computing device 200 and/or physiological information that defines the activity state and/or physical well-being of a user of computing device 200. In some examples, a sensor may be an input component that obtains physical position, movement, and/or location information of computing device 200. For instance, sensors may include one or more location sensors (e.g., GNSS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

Communication unit 244 of computing device 200 may communicate with one or more external devices via one or more wired and/or wireless networks by transmitting and/or receiving network signals on the one or more networks. Examples of communication units 244 include a network interface card (e.g. such as an Ethernet card), an optical transceiver, a radio frequency transceiver, a GPS receiver, or any other type of device that can send and/or receive information. Other examples of communication unit 244 may include short wave radios, cellular data radios, wireless network radios, as well as universal serial bus (USB) controllers.

Output component 246 of computing device 200 may generate one or more outputs. Examples of outputs are tactile, audio, and video output. Output component 246 of computing device 200, in one example, includes a presence-sensitive display, sound card, video graphics adapter card, speaker, liquid crystal display (LCD), or any other type of device for generating output to a human or machine.

Presence-sensitive display 202 of computing device 200 may include touch sensor 206, electrodes 224, display panel 228, and display controller 230. Electrodes 224 may form a matrix of row and column electrodes on either side of a dielectric material. Electrodes 224 may be constructed from a transparent conductive material, such as Indium Tin Oxide (ITO). As such, electrodes 224 may be placed above a display component (e.g., display panel 228) and be invisible to a user. The dielectric material may be a glass substrate.

Touch sensor 206 may include a touch controller 226. Touch controller 226 may perform one or more operations to sense user input via electrodes 224. For instance, touch controller 226 may output a voltage signal across the electrodes and sense a resultant change in capacitance (e.g., as induced by the presence of a finger or other object on or near presence-sensitive display 202). When an electrode of electrodes 224 is driven with a voltage signal, the electrode's inherent capacitance to other objects can be measured (such as a human finger, another electrode, or ground). Changes to the surrounding environment affect changes in the inherent capacitance of the electrode. Touch controller 226 may output an indication of the sensed user input to one or more other components of computing device 200, such as UI module 214.

Display panel 228 may be a display device capable of rendering graphical user interfaces. Examples of display panel 228 include, but are not limited to, liquid crystal displays (LCD), dot matrix displays, light emitting diode (LED) displays, microLED displays organic light-emitting diode (OLED) displays, e-ink, or similar monochrome or color displays capable of outputting visible information to a user of computing device 200.

Display controller 230 may perform one or more operations to manage the operation of display panel 228. For instance, display controller 230 may receive instructions from UI module 214 that cause display controller 230 to control display panel 228 to render a particular graphical user interface.

Processor 204 may implement functionality and/or execute instructions within computing device 200. For example, processor 204 may receive and execute instructions that provide the functionality of UI module 214, fingerprint enrollment module 218 fingerprint authentication module 236, touch mapping module 238, and OS 240. These instructions executed by processor 204 may cause computing device 200 to store and/or modify information within storage device 210 of processor 204 during program execution. Processor 204 may execute instructions of UI module 214, fingerprint enrollment module 218, fingerprint authentication module 236, touch mapping module 238, and OS 240 to perform one or more operations. That is, UI module 214, fingerprint enrollment module 218 fingerprint authentication module 236, touch mapping module 238, and OS 240 may be operable by processor 204 to perform various functions described herein.

Storage device 210 within computing device 200 may store information for processing during operation of computing device 200 (e.g., computing device 200 may store data accessed by UI module 214, fingerprint enrollment module 218, fingerprint authentication module 236, touch mapping module 238, and OS 240 during execution at computing device 200). In some examples, storage device 210 may be a temporary memory, meaning that a primary purpose of storage device 210 is not long-term storage. Storage device 210 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage device 210 may include one or more computer-readable storage media. Storage device 210 may be configured to store larger amounts of information than volatile memory. Storage device 210 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage device 210 may store program instructions and/or information (e.g., touch input data repository 220, fingerprint data repository 222, etc.) associated with UI module 214, fingerprint enrollment module 218, fingerprint authentication module 236, touch mapping module 238, and OS 240.

As discussed above, UI module 214 may act as an intermediary between various components of computing device 200 to make determinations based on user input detected by a user interface component and generate output at the user interface component in response to the user input. As shown in FIG. 2, UI module 214 may include touch driver 232 and display driver 234. Touch driver 232 may interact with touch controller 226 and OS 240 to process user input sensed via presence-sensitive display 202. Display driver 234 may interact with display controller 230 and OS 240 to process output for display at display panel 228, which may be altered based on user input received via electrodes 224.

Fingerprint enrollment module 218 may be substantially similar to fingerprint enrollment module 118 of FIG. 1. In some examples, fingerprint enrollment module 218 may determine whether at least one parameter of the touch inputs satisfies a corresponding at least one threshold for the touch inputs. For example, fingerprint enrollment module 218 may determine, based on the first set of heatmaps, whether at least one parameter (e.g., a pressure exerted by the finger on presence-sensitive display 102, a velocity of the finger, a shape of a contacting area) of the first touch input satisfies a corresponding at least one threshold for the first touch input. Similarly, fingerprint enrollment module 218 may determine, based on the second set of heatmaps, whether at least one parameter of the second touch input satisfies a corresponding at least one threshold for the second touch input.

In some examples, a parameter may satisfy the corresponding threshold when the parameter is greater than (or equal to) a threshold value. For instance, the pressure parameter may satisfy the corresponding pressure threshold when a pressure (e.g., a moving average of the pressure) exerted by the finger on presence-sensitive display 102 (as indicated by the capacitance values of a set of heatmaps) is greater than a threshold pressure value. In other examples, a parameter may satisfy the corresponding threshold when the parameter is less than (or equal to) a threshold value. For instance, the velocity parameter may satisfy the corresponding velocity threshold when a velocity of the finger (which may be determined from a set of heatmaps) is less than a threshold velocity value.

Fingerprint enrollment module 218 may perform an action based on whether at least one parameter satisfies a corresponding at least one threshold for the touch input. For example, responsive to determining that the at least one parameter of the first touch input satisfies the corresponding at least one threshold for the first touch input, fingerprint enrollment module 218 may store an indication of the first portion in fingerprint data repository 222. On the other hand, responsive to fingerprint enrollment module 218 determining that the at least one parameter of the first touch input does not satisfy the corresponding at least one threshold for the first touch input, UI module 214 may output, for display by presence-sensitive display 202, a GUI including a guide (e.g., a graphical element including instructions, visual aids, etc.) for improving generation of the at least partial fingerprint. For instance, the guide may include instructions requesting that the user press the user's finger onto presence-sensitive display 202 more firmly, flatly, etc. The guide may include instructions related to the parameters that failed to satisfy the corresponding thresholds.

In a similar fashion, responsive to determining that the at least one parameter of the second touch input satisfies the corresponding at least one threshold for the second touch input, fingerprint enrollment module 218 may store an indication of the second portion in fingerprint data repository 222. On the other hand, responsive to fingerprint enrollment module 218 determining that the at least one parameter of the second touch input does not satisfy the corresponding at least one threshold for the second touch input, UI module 214 may output, for display by presence-sensitive display 202, a GUI including the guide for improving generation of the at least partial fingerprint.

Fingerprint authentication module 236 may authenticate the user by comparing a current, captured image of the user's fingerprint to the enrolled fingerprint. Responsive to fingerprint authentication module 236 authenticating the user based on the captured image of the user's fingerprint, OS 240 may perform an unlock operation or may otherwise provide the user with access to applications installed at computing device 200. In some examples, fingerprint authentication module 236 may be considered a component of OS 240.

In some examples, fingerprint authentication module 236 may use both touch input data and fingerprint data to perform fingerprint authentication operations. In an example, fingerprint enrollment module 218 of computing device 200 may have enrolled a fingerprint of a first finger in accordance with techniques of this disclosure. Per a fingerprint authentication operation, a user may provide, at a current time, a current touch input with a second finger (which may or may not be different from the first finger with the enrolled fingerprint) to presence-sensitive display 202 and in turn touch sensor 206. Presence-sensitive display 202 may detect the current touch input provided by the second finger of the second user at the current time. Responsive to presence-sensitive display 202 detecting the current touch input, touch sensor 206 may generate, and fingerprint authentication module 236 may obtain, a current set of touch input data indicative of the current touch input. Fingerprint authentication module 236 may determine a current set of heatmaps associated with the current touch input based on the current set of touch input data.

While detecting the current touch input, fingerprint sensor 208 (and in turn fingerprint authentication module 236) may obtain a current portion of the fingerprint of the second finger. The first portion of the fingerprint of the second finger may be a current set of fingerprint data (e.g., an image) generated by fingerprint sensor 208 that is representative of the portion of the second finger positioned at fingerprint sensor 208 at the current time. The current portion of the fingerprint may be any portion of the fingerprint, such as a center portion, top portion, bottom portion, edge portion, etc. In some examples, fingerprint sensor 208 may obtain the current set of fingerprint data in response to fingerprint authentication module 236 determining, based on the current set of heatmaps, that at least one parameter of the current touch input detected at presence-sensitive display 202 at the current time has stabilized (e.g., remained within a predetermined range of values for a predetermined amount of time).

Fingerprint authentication module 236 may determine a current area of the second finger associated with the current portion of the fingerprint. For instance, fingerprint authentication module 236 may determine, based on a current set of heatmaps generated by touch sensor 206, that the centroid of the area of the second finger contacting presence-sensitive display 202 during the current touch input is positioned at fingerprint sensor 208, fingerprint authentication module 236 may determine the current area of the fingerprint to be the centroid of the fingerprint (e.g., located at the center portion of the fingerprint).

Fingerprint authentication module 236 may determine a reference portion of the enrolled fingerprint of the first finger (e.g., the at least partial fingerprint generated by fingerprint enrollment module 218) corresponding to the current portion based on the current area of the second finger. For instance, in the above example, fingerprint authentication module 236 may determine the reference portion of the enrolled fingerprint to be the center portion of the enrolled fingerprint. Fingerprint authentication module 236 may then compare the current portion of the second finger to the reference portion of the at least partial fingerprint of the first finger.

Fingerprint authentication module 236 may selectively authenticate a user (e.g., the second user) based on the comparison. For example, responsive to fingerprint authentication module 236 determining that the current portion of the second finger matches the reference portion of the at least partial fingerprint, fingerprint authentication module 236 may authenticate the user. Responsive to fingerprint authentication module 236 determining that the current portion of the second finger does not match the reference portion of the at least partial fingerprint, fingerprint authentication module 236 may not authenticate the user.

In some examples, fingerprint authentication module 236 may use a machine learning algorithm to determine whether the current portion of the second finger matches the reference portion of the at least partial fingerprint. For instance, the machine learning algorithm may perform classification in which the machine learning algorithm provides a numerical value descriptive of a degree to which it is believed that the current portion should be classified into a "match" class or a "not match" class. In some instances, the numerical values provided by the machine learning algorithm may be referred to as "confidence scores" that are indicative of a respective confidence associated with classification of the input into the respective class. In some examples, the confidence scores can be compared to one or more thresholds to render a discrete categorical prediction. In some examples, only a certain number of classes (e.g., one) with the relatively largest confidence scores may be selected to render a discrete categorical prediction.

It is noted that fingerprint authentication module 236 may use the current set of heatmaps to determine which finger the user used to provide the current touch input (e.g., based on information about size, shape, etc., of the finger derived from the current set of heatmaps). Thus, fingerprint authentication module 236 may search for the reference portion of the enrolled fingerprint based on a prediction (e.g., a probability) of the finger that fingerprint authentication module 236 determines to have been used to provide the current touch input. In any case, advantages of the techniques of this disclosure may include reducing latency by, for example, enabling fingerprint authentication module 236 to more efficiently identify the relevant portion of an enrolled fingerprint to compare to the current portion of the finger.

Touch mapping module 238 may map touch input data generated by a touch sensor (e.g., one or more of electrodes 224) of presence-sensitive display 202 to a touch location at the presence-sensitive display 202, as described in further detail below. In some examples, touch mapping module 238 may be considered a component of OS 240.

OS 240, or a component thereof, may manage interactions between applications and a user of computing device 200. As shown in the example of FIG. 2, OS 240 may manage operations between fingerprint enrollment module 218 and a user of computing device 200. In some examples, UI module 214 may be considered a component of OS 240.

Presence-sensitive display 202 may detect the user input using, for example, a self-capacitance scan, a mutual-capacitance scan, etc. For instance, electrodes 224, touch controller 226, and touch driver 232 may collectively operate to generate mutual-capacitance data based on a mutual-capacitance scan and/or to generate self-capacitance data based on a self-capacitance scan. Further details of a self-capacitance scan are discussed below with reference to FIG. 3. Further details of a mutual-capacitance scan are discussed below with reference to FIG. 4.

Figure 3:
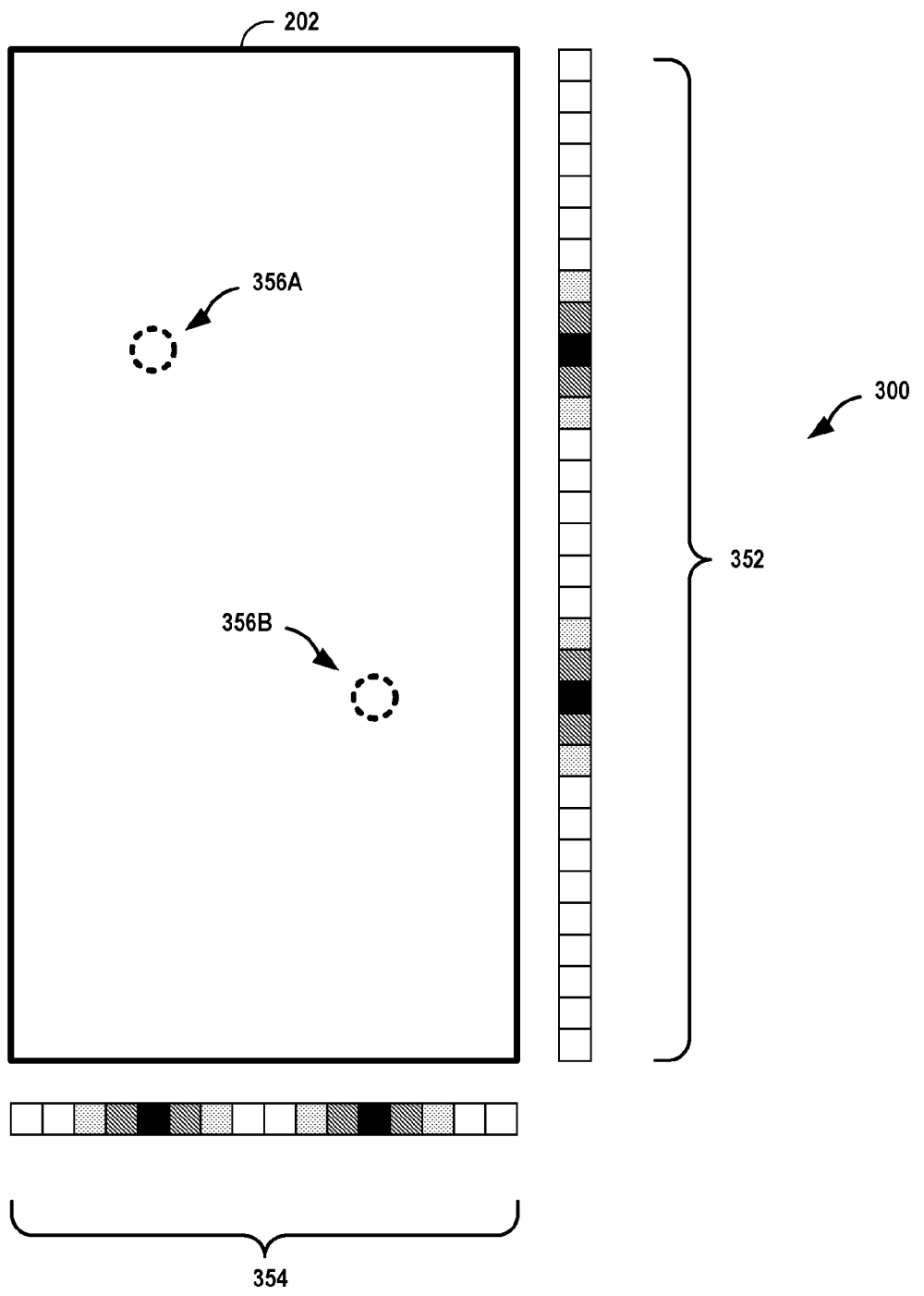
FIG. 3 is a conceptual diagram illustrating example self-capacitance data generated by a presence-sensitive display of a computing device in accordance with one or more techniques of this disclosure.

FIG. 3 is a conceptual diagram illustrating example self-capacitance data generated by a presence-sensitive display of a computing device in accordance with one or more techniques of this disclosure. Self-capacitance data 350 of FIG. 3 is discussed with reference to computing device 200 of FIG. 2. However, other computing devices may generate self-capacitance data 350. To perform a self-capacitance scan (also referred to as a surface capacitance scan), touch controller 226 may drive an electrode of electrodes 224 with a signal and measure the capacitance across the entire electrode (e.g., with respect to ground). When another conductive object approaches the electrode, a capacitor is formed between them, reducing the capacitance between the electrode and ground. Touch controller 226 may measure this capacitance by driving all electrodes of electrodes 224 in each direction (e.g., all of the rows and then all of the columns) and measuring their capacitance. Where electrodes 224 includes r row electrodes and c column electrodes, the self-capacitance scan may produce r+c measurements, which are collectively referred to as self-capacitance data 350.

Self-capacitance data 350 of FIG. 3 may represent self-capacitance data measured by presence-sensitive display 202, such as when the user is performing a pinch gesture. As shown in FIG. 3, self-capacitance data 350 includes row capacitance values 352 and column capacitance values 354. For row capacitance values 302 and column capacitance values 304, darker cells may indicate higher or lower values relative to lighter cells. As shown in FIG. 3, by placing the user's fingers at positions 356A and 356B, the user may induce higher capacitance values.

Figure 4:
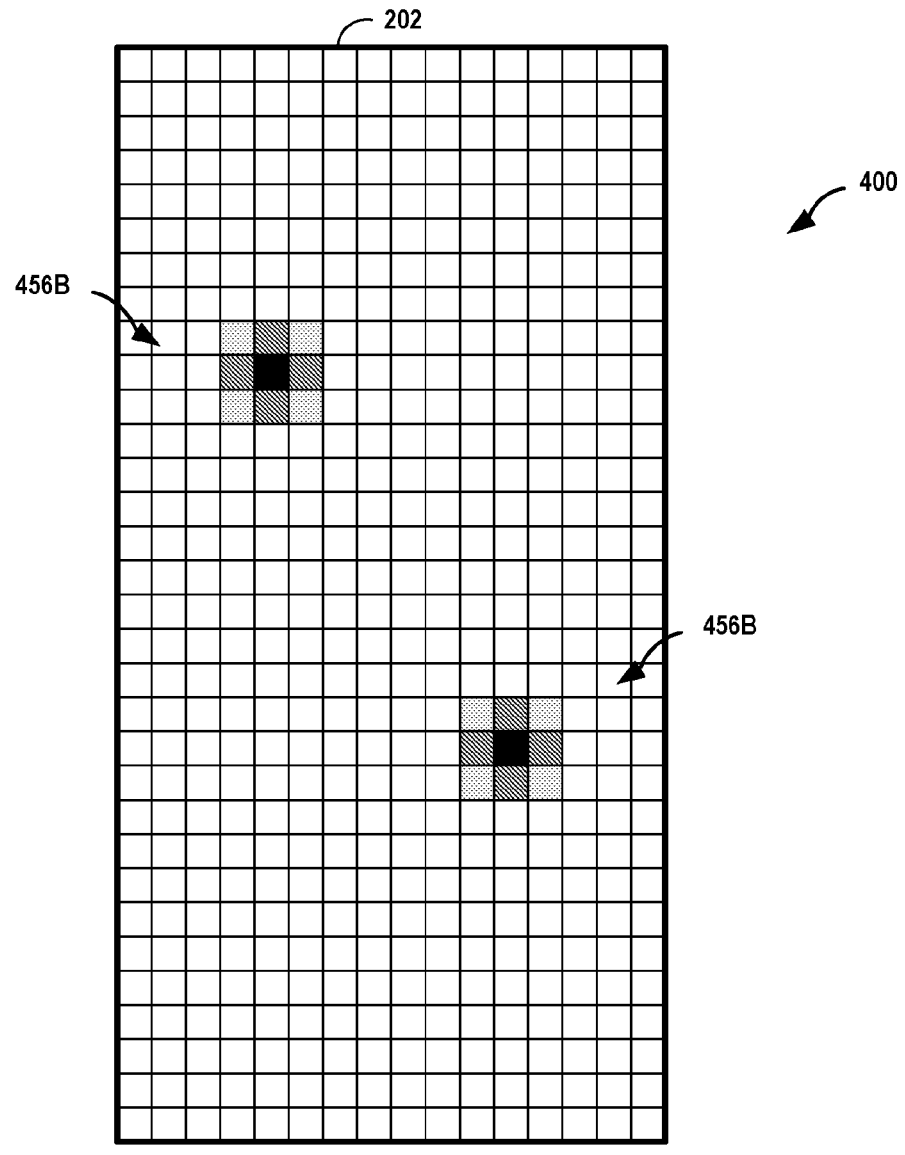
FIG. 4 is a conceptual diagram illustrating example mutual-capacitance data generated by a presence-sensitive display of a computing device in accordance with one or more techniques of this disclosure.

FIG. 4 is a conceptual diagram illustrating example mutual-capacitance data generated by a presence-sensitive display of a computing device in accordance with one or more techniques of this disclosure. Mutual-capacitance data 450 of FIG. 4 is discussed with reference to computing device 200 of FIG. 2. However, other computing devices may generate mutual-capacitance data 450.

To perform a mutual-capacitance scan, touch controller 226 may take advantage of the inherent capacitive coupling that exists between the row and column electrodes of electrodes 224 at the locations that they overlap (e.g., touch sensor cells). For instance, touch controller 226 may drive a single electrode of electrodes 224 (e.g., a row) and measure the capacitance on the intersecting electrodes of electrodes 224 (e.g., the columns). Touch controller 226 may repeat this process until all touch sensor cells have been sensed. Where electrodes 224 includes r row electrodes and c column electrodes, the mutual-capacitance scan produces r×c measurements, which are collectively referred to as mutual-capacitance data 450. For mutual-capacitance data 450, darker cells may indicate higher or lower values relative to lighter cells. Mutual-capacitance sensing therefore involves the sensing of each cell individually to generate a full "image" of the panel, which may allow touch controller 226 to unambiguously separate each contact. As shown in FIG. 4, by placing the user's fingers at positions 456A and 456B, the user may induce higher capacitance values.

Figure 5B:
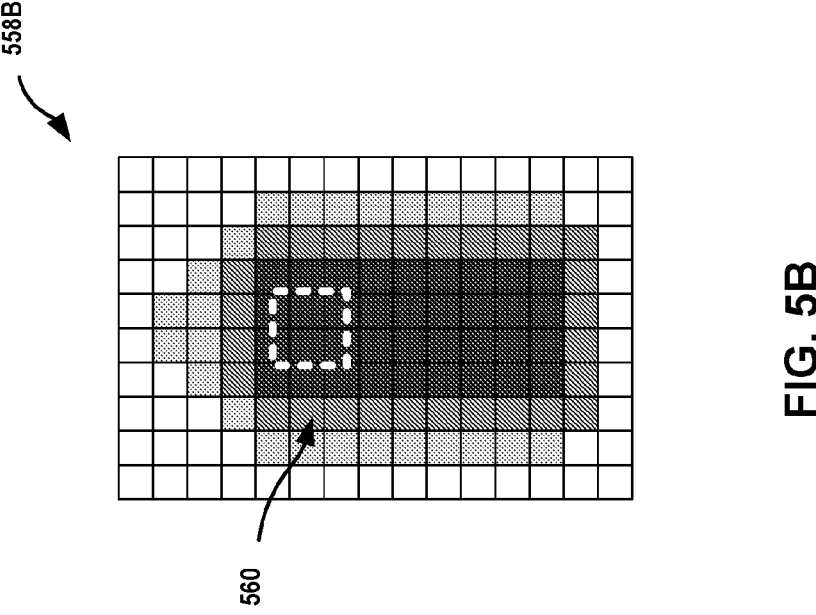
FIGS. 5A-5B are conceptual diagrams illustrating a plurality of heatmaps in accordance with one or more techniques of this disclosure.
Figure 5A:
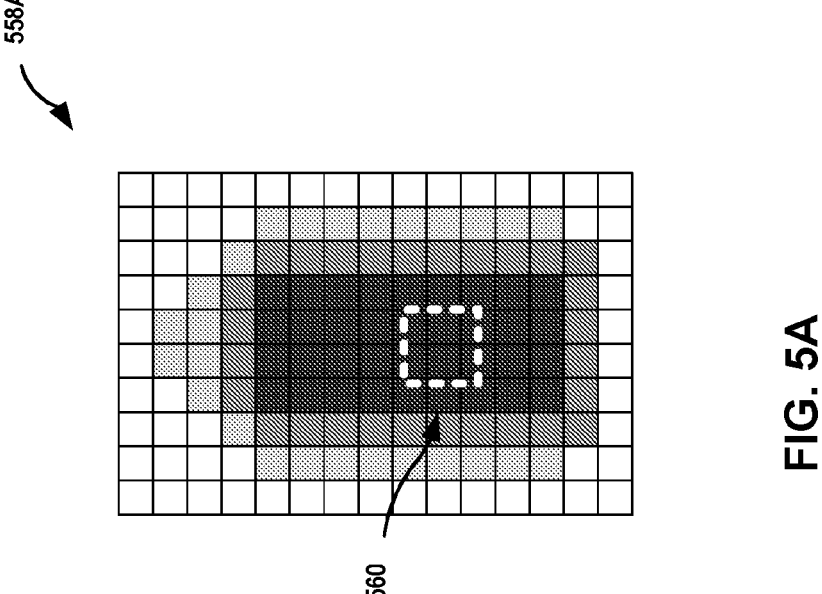

FIGS. 5A-5B are conceptual diagrams illustrating a plurality of heatmaps in accordance with one or more techniques of this disclosure. In particular, FIG. 5A is a conceptual diagram of a heatmap 558A, and FIG. 5B is a conceptual diagram of a heatmap 558B (collectively, "heatmaps 558"). Heatmap 558 is associated with a finger contact and is discussed with reference to computing device 200 of FIG. 2. As shown in FIGS. 5A-5B, by bringing an input object, such as a finger, in proximity with a presence-sensitive display, the capacitance of several cells may be altered. As discussed herein, based on the altering of these capacitances, touch controller 226 may identify touch contacts using mutual-capacitance data.

For each identified touch contact, touch controller 226 may identify the covered cells of the contact and determine, based on the covered cells, a region of display panel 228 that corresponds to the covered cells, such as a set of coordinates that are in the resolution of display panel 228. In the example of FIGS. 5A-5B, touch controller 226 may identify the covered cells as a contiguous set of non-white cells (e.g., a set of contiguous cells all having a capacitance value greater than a threshold value). In examples where a user presses the user's finger onto presence-sensitive display 202, the continuous set of non-white cells may have a shape and size corresponding to the shape and size of the user's finger.

As discussed above, fingerprint sensor 208 may be positioned beneath touch sensor 206. Fingerprint sensor 208 may be a UDFS or a through-display sensor. In FIGS. 5A-5B, fingerprint sensor 208 is under a region 560, which encompasses cells of touch sensor 206. As such, with respect to the example of FIG. 5A, fingerprint sensor 208 may generate a set of fingerprint data representative of a lower-center portion of the finger positioned at fingerprint sensor 208 because that is the portion of the finger positioned at (e.g., covering) fingerprint sensor 208. With respect to the example of FIG. 5B, fingerprint sensor 208 may generate a set of fingerprint data representative of an upper-center portion of the finger positioned at fingerprint sensor 208.

In some examples, one or more settings of fingerprint sensor 208 may change based on heatmaps 558. For example, if the capacitance values of the cells above fingerprint sensor 208 (as indicated by region 560) indicate that relatively little pressure is being exerted on the cells, fingerprint sensor 208 may decrease a gain value of fingerprint sensor 208. This may be advantageous because if a user's finger does not completely cover fingerprint sensor 208 (which may be indicated by heatmaps 558), ambient light may fall on fingerprint sensor 208, resulting in overexposure adversely affecting fingerprint sensing operations (e.g., a fingerprint enrollment operation, fingerprint authentication operation, etc.).

FIGS. 6A-6D are conceptual diagrams illustrating example techniques for generating an at least partial fingerprint, such as fingerprints 662A-662D (collectively, "fingerprints 662"). FIGS. 6A-6D are discussed with reference to computing device 200 of FIG. 2. As discussed above, fingerprint sensor 208 may be a UDFS or a through-display sensor. As such, fingerprint sensor 208 may be below a region 660, which encompasses cells of touch sensor 206.

Figures 6A, 6B, 6C, 6D:
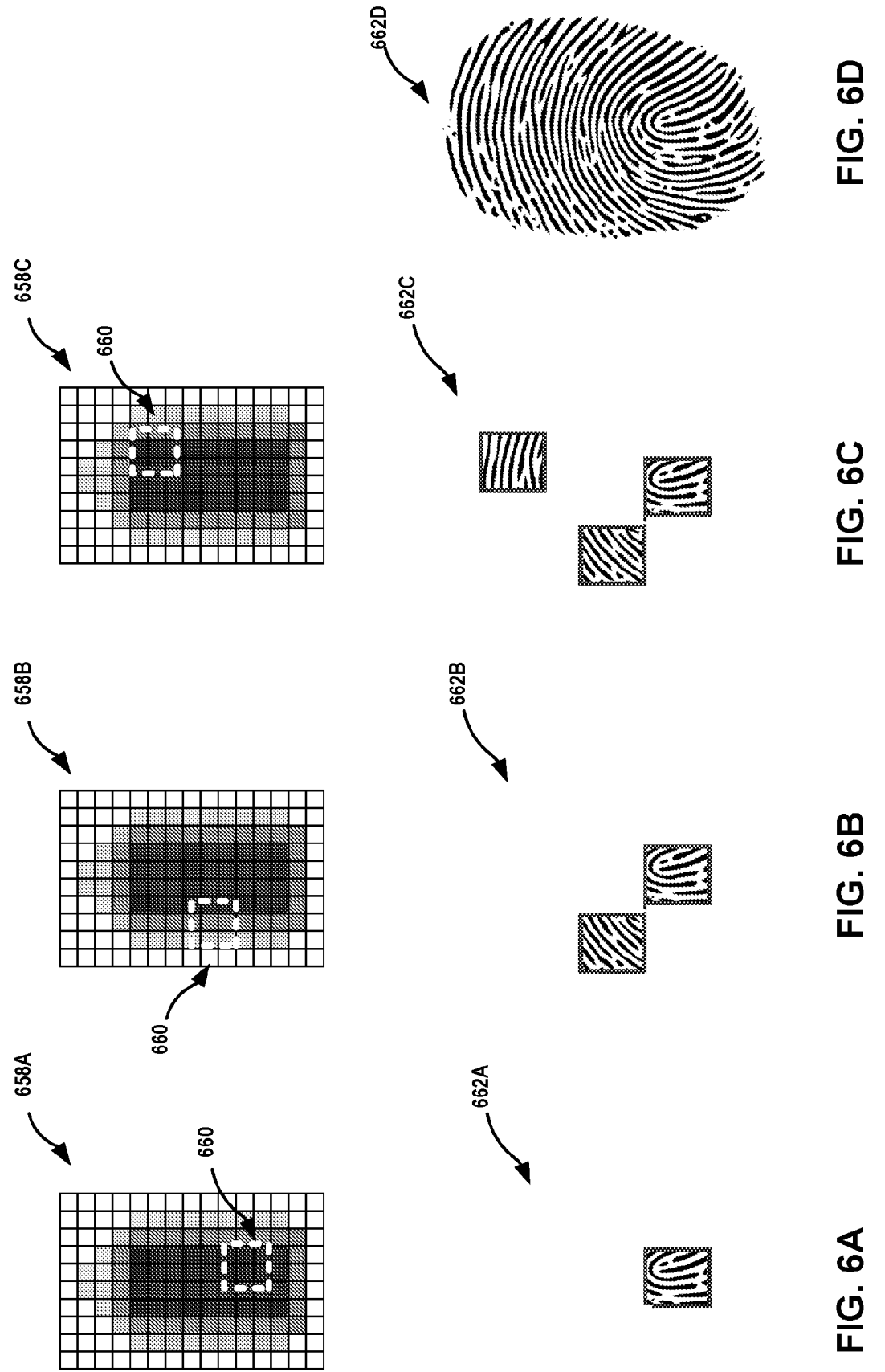
FIGS. 6A-6D are conceptual diagrams illustrating example techniques for determining a partial fingerprint in accordance with one or more techniques of this disclosure.

Fingerprint enrollment module 218 may determine a first area of the finger associated with a first portion of a finger positioned at fingerprint sensor 208 at a first time based on a first set of heatmaps 658A. As shown in FIG. 6A, region 660 may encompass cells of touch sensor 206 that correspond to a lower-slightly right portion of first set of heatmaps 658A. The shape and size of first set of heatmaps 658A may correspond to the shape and size of the user's finger. Thus, fingerprint enrollment module 218 may determine that the first area is the lower-slightly right portion of the user's finger as indicated by the location of region 660 relative to first set of heatmaps 658A.

Fingerprint enrollment module 218 may process additional touch inputs in a substantially similar manner. For example, fingerprint enrollment module 218 may determine a second area associated with a second portion of a finger positioned at fingerprint sensor 208 at a second time based on a second set of heatmaps 658B. As shown in FIG. 6B, region 660 is in a middle-left portion of second set of heatmaps 658B. Thus, fingerprint enrollment module 218 may determine that the second area is the middle-left portion of the user's finger as indicated by the location of region 660 relative to second set of heatmaps 658B. As further shown in FIG. 6B, fingerprint enrollment module 218 may use the first area of the finger and the second area of the finger to align the first portion of the fingerprint and the second portion of the fingerprint to determine fingerprint 662B.

In another example, fingerprint enrollment module 218 may determine a third area of a finger associated with a third portion of a fingerprint positioned at fingerprint sensor 208 at a third time based on a third set of heatmaps 658C. As shown in FIG. 6C, region 660 is in a top-right portion of third set of heatmaps 658C. Thus, fingerprint enrollment module 218 may determine that the third area is the top-right portion of the user's finger as indicated by the location of region 660 relative to third set of heatmaps 658C. As further shown in FIG. 6C, fingerprint enrollment module 218 may use the first, second, and third areas of the finger to align the first, second, and third portion of the fingerprint to determine fingerprint 662C.

Fingerprint enrollment module 218 may determine any number of areas of the finger and align any number of portions of the fingerprint to generate an at least partial fingerprint. For example, FIG. 6D shows fingerprint 662D determined by fingerprint enrollment module 218 where fingerprint 662D is a complete fingerprint. While fingerprint 662D is a complete fingerprint, it should be understood that enrolling only a portion of a fingerprint may be sufficient for a fingerprint enrollment operation. Accordingly, fingerprint enrollment module 218 may determine areas of the finger and align portions of the fingerprint any number of times to determine a partial or complete fingerprint.

Fingerprint enrollment module 218 may perform the operation described in the above examples as many times as necessary to generate a partial fingerprint including a sufficient portion of the fingerprint being enrolled. For instance, fingerprint enrollment module 218 may perform the operation until fingerprint 662D includes the entire fingerprint.

Figure 7B:
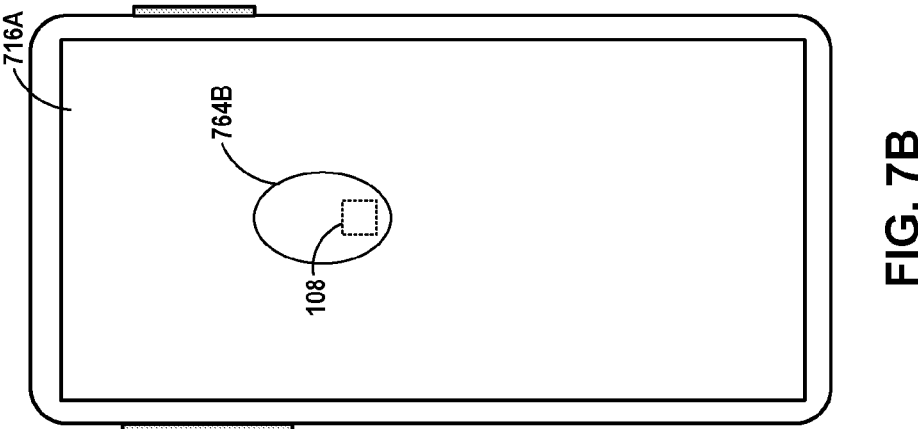
FIGS. 7A-7B are conceptual diagrams of example user interfaces indicating finger positions in accordance with one or more techniques of this disclosure.
Figure 7A:
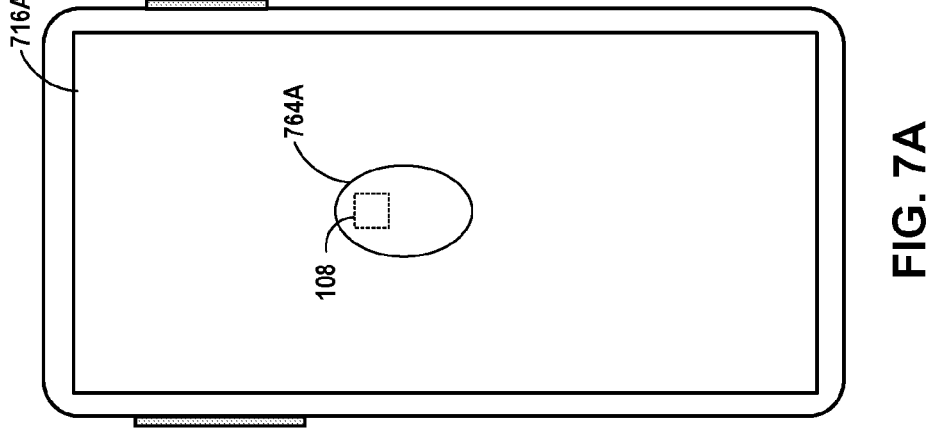

FIGS. 7A-7B are conceptual diagrams of example UIs (e.g., a graphical user interface) that guide a user during a fingerprint enrollment operation. FIGS. 7A-7B are discussed with reference to computing device 100 of FIG. 1. As shown in FIG. 7A, UI module 114 may cause presence-sensitive display 102 to display a UI 716A. UI 716A may indicate a first finger position 764A. A user may position the user's finger at first finger position 764A at a first time. Fingerprint enrollment module 118 may obtain a first portion of the fingerprint from fingerprint sensor 108. Fingerprint enrollment module 118 may determine the area of the finger associated with the first portion of the fingerprint based on touch input data from a touch sensor (e.g., touch sensor 106). Next, as shown in FIG. 7B, UI module 114 may cause presence-sensitive display 102 to display a UI 716B. UI 716B may indicate a second finger position 764B. A user may position the user's finger at second finger position 764B at a second time. Fingerprint enrollment module 118 may obtain a second portion of the fingerprint from fingerprint sensor 108. Fingerprint enrollment module 118 may determine the area of the finger associated with the second portion of the fingerprint based on touch input data from a touch sensor (e.g., touch sensor 106).

FIG. 8 is a flowchart illustrating example operations of an example computing device in accordance with one or more aspects of the present disclosure. Although the example operation of FIG. 8 is described as being performed by computing device 100 of FIG. 1, in other examples some or all of the example operation may be performed by another computing device.

Computing device 100 may execute fingerprint enrollment module 118. During execution of fingerprint enrollment module 118, presence-sensitive display of computing device 100 may detect a first touch input (800). A user of computing device 100 may provide the first touch input with a finger and at a first time.

While detecting the first touch input, fingerprint sensor 108 (and in turn fingerprint enrollment module 118) may obtain a first portion of a fingerprint of the finger (802). The first portion of the fingerprint of the finger may be a first set of fingerprint data generated by fingerprint sensor 108 that is representative of the portion of the finger positioned at fingerprint sensor 108 at the first time. The first portion of the fingerprint may be any portion of the fingerprint, such as a center portion, top portion, bottom portion, edge portion, etc.

Additionally, responsive to presence-sensitive display 102 detecting the first touch input, touch sensor 106 may generate, and fingerprint enrollment module 118 may obtain, a first set of touch input data indicative of the first touch input. Fingerprint enrollment module 118 may determine a first set of heatmaps based on the first set of touch input data. Fingerprint enrollment module 118 may process heatmaps, such as the first set of heatmaps, to determine parameters of the touch inputs of the touch inputs. In some examples, fingerprint sensor 108 may obtain the first portion of the fingerprint in response to fingerprint enrollment module 118 determining, based on the first set of heatmaps, that at least one parameter of the first touch input detected at presence-sensitive display 102 at the first time has stabilized (e.g., remained within a predetermined range of values for a predetermined amount of time). In general, parameters of touch inputs 112 may include pressure and velocity.

Presence-sensitive display 102 may detect a second touch input (804). A user of computing device 100 may provide the second touch input with a finger (e.g., the same finger or a different finger) and at a second time. While detecting the second touch input, fingerprint sensor 108 (and in turn fingerprint enrollment module 118) may obtain a second portion of a fingerprint of the finger (806). The second portion of the fingerprint of the finger may be a second set of fingerprint data generated by fingerprint sensor 108 that is representative of the portion of the finger positioned at fingerprint sensor 108 at the second time. The second portion of the fingerprint may be any portion of the fingerprint, such as a center portion, top portion, bottom portion, edge portion, etc.

Additionally, responsive to presence-sensitive display 102 detecting the second touch input, touch sensor 106 may generate, and fingerprint enrollment module 118 may obtain, a second set of touch input data indicative of the second touch input. Fingerprint enrollment module 118 may determine a second set of heatmaps based on the second set of touch input data. Fingerprint enrollment module 118 may process heatmaps, such as the second set of heatmaps, to determine parameters of the touch inputs. In some examples, fingerprint sensor 108 may obtain the second portion of the fingerprint in response to fingerprint enrollment module 118 determining, based on the second set of heatmaps associated with the second touch input, that at least one parameter of the second touch input detected at presence-sensitive display 102 at the second time has stabilized (e.g., remained within a predetermined range of values for a predetermined amount of time). In general, parameters of touch inputs 112 may include pressure and velocity.

For each captured portion of the fingerprint, fingerprint enrollment module 118 may determine an area (e.g., location, spot, region, coordinate, position, etc.) of the finger associated with the portion (808). For instance, fingerprint enrollment module 118 may determine a first area of the finger associated with the first portion of the fingerprint and a second area of the finger associated with the second portion of the fingerprint. In some examples, fingerprint enrollment module 118 may determine the first area of the finger associated with the first portion of the fingerprint based on the first set of heatmaps. Similarly, fingerprint enrollment module 118 may determine the second area of the finger associated with the second portion of the fingerprint based on the second set of heatmaps.

Fingerprint enrollment module 118 may generate an at least partial fingerprint based on the first portion of the fingerprint, the first area of the finger, the second portion of the fingerprint, and the second area of the finger (810). For instance, fingerprint enrollment module 118 may align the first portion of the fingerprint and the second portion of the fingerprint based on the first area of the finger and the second area of the finger.

Although touch inputs 112 are described as including a first touch input and a second touch input, a person of ordinary skill should understand that touch inputs 112 may include one or more additional touch inputs (e.g., a third touch input, a fourth touch input, etc.). In such examples, the techniques of this disclosure may be similarly applied to the one or more additional touch inputs in order to ensure that a sufficient portion of the fingerprint has been enrolled (e.g., because just the first portion and the second portion are insufficient for completing a fingerprint enrollment operation). In addition, the techniques of this disclosure may be applied to one or more fingers, one or more hands, and one or more users.

Aspects of this disclosure include the following examples.

Example 1: A method includes detecting, by a presence-sensitive display of a computing device, a first touch input of a finger at a first time; while detecting the first touch input, obtaining, by a fingerprint sensor of the computing device, a first portion of a fingerprint of the finger, wherein the fingerprint sensor is configured to obtain the fingerprint through the presence-sensitive display; detecting, by the presence-sensitive display, a second touch input of the finger at a second time; while detecting the second touch input, obtaining, by the fingerprint sensor, a second portion of the fingerprint of the finger; determining, by the computing device, a first area of the finger associated with the first portion of the fingerprint and a second area of the finger associated with the second portion of the fingerprint; and generating, by the computing device, an at least partial fingerprint of the finger based on the first portion of the fingerprint, the first area of the finger, the second portion of the fingerprint, and the second area of the finger.

Example 2: The method of example 1, further includes determining, by the computing device, a first set of heatmaps associated with the first touch input, wherein determining the first area of the finger associated with the first portion of the fingerprint is based on the first set of heatmaps; and determining, by the computing device, a second set of heatmaps associated with the second touch input, wherein determining the second area of the finger associated with the second portion of the fingerprint is based on the second set of heatmaps.

Example 3: The method of example 2, wherein the first set of heatmaps include one or more indications of capacitance values for a first region of the presence-sensitive display, and wherein the second set of heatmaps include one or more indications of capacitance values for a second region of the presence-sensitive display.

Example 4: The method of example 2 or 3, further includes determining, by the computing device and based on the first set of heatmaps, whether at least one parameter of the first touch input satisfies a corresponding at least one threshold for the first touch input; and determining, by the computing device and based on the second set of heatmaps, whether at least one parameter of the second touch input satisfies a corresponding at least one threshold for the second touch input.

Example 5: The method of example 4, further includes responsive to determining that the at least one parameter of the first touch input satisfies the corresponding at least one threshold for the first touch input, storing, by the computing device, an indication of the first portion of the fingerprint in a memory of the computing device; and responsive to determining that the at least one parameter of the second touch input satisfies the corresponding at least one threshold for the second touch input, storing, by the computing device, an indication of the second portion of the fingerprint in the memory.

Example 6: The method of example 4, further includes responsive to determining that the at least one parameter of the first touch input does not satisfy the corresponding at least one threshold for the first touch input, outputting, for display by the presence-sensitive display, a graphical user interface including a guide for improving generation of the at least partial fingerprint; and responsive to determining that the at least one parameter of the second touch input does not satisfy the corresponding at least one threshold for the second touch input, outputting, by the computing device and for display by the presence-sensitive display, the graphical user interface including the guide.

Example 7: The method of any of examples 4 through 6, wherein obtaining the first portion of the fingerprint is in response to the computing device determining that the at least one parameter of the first touch input has stabilized, and wherein obtaining the second portion of the fingerprint is in response to the computing device determining that the at least one parameter of the second touch input has stabilized.

Example 8: The method of any of examples 4 through 7, wherein the at least one parameter of the first touch input includes one or more of a pressure exerted by the finger on the presence-sensitive display, a velocity of the finger, a shape of a contacting area of the finger, or a size of the contacting area of the finger, and wherein the at least one parameter of the second touch input includes one or more of the pressure exerted by the finger on the presence-sensitive display, the velocity of the finger, the shape of the contacting area of the finger, or the size of the contacting area of the finger.

Example 9: The method of any of examples 2 through 8, further comprising changing a gain value setting of the fingerprint sensor based on one or more of the first set of heatmaps or the second set of heatmaps.

Example 10: The method of any of examples 1 through 9, wherein determining the at least partial fingerprint comprises aligning the first portion of the fingerprint and the second portion of the fingerprint based on the first area of the finger and the second area of the finger.

Example 11: The method of any of examples 1 through 10, further includes outputting, by the computing device and for display by the presence-sensitive display, a graphical user interface including an indication of a first finger position for the finger at the first time, and an indication of a second finger position for the finger at the second time.

Example 12: The method of any of examples 1 to 11, wherein the finger is a first finger, the method further includes detecting, by the presence-sensitive display, a current touch input of a second finger at a current time; while detecting the current touch input, obtaining, by the fingerprint sensor, a current portion of a fingerprint of the second finger; determining, by the computing device, a current area of the second finger associated with the current portion of the fingerprint of the second finger; determining, based on the current area of the second finger, a reference portion of the at least partial fingerprint of the first finger corresponding to the current portion of the fingerprint of the second finger; and selectively authenticating, by the computing device, a user by at least comparing the current portion of the fingerprint of the second finger to the reference portion of the at least partial fingerprint of the first finger.

Example 13: A computing device includes a presence-sensitive display configured to detect touch input; a fingerprint sensor configured to obtain a fingerprint of a finger through the presence-sensitive display; one or more processors; and a memory that stores instructions that, when executed by the one or more processors, cause the one or more processors to: receive, from the presence-sensitive display, a first touch input of a finger at a first time; while the presence-sensitive display is detecting the first touch input, receive, from the fingerprint sensor, a first portion of the fingerprint of the finger; receive, from the presence-sensitive display, a second touch input of the finger at a second time; while the presence-sensitive display is detecting the second touch input, receive, from the fingerprint sensor, a second portion of the fingerprint of the finger; determine a first area of the finger associated with the first portion of the fingerprint and a second area of the finger associated with the second portion of the fingerprint; and generate an at least partial fingerprint of the finger based on the first portion of the fingerprint, the first area of the finger, the second portion of the fingerprint, and the second area of the finger.

Example 14: The computing device of example 13, wherein the instructions further cause the one or more processors to: determine a first set of heatmaps associated with the first touch input, wherein the one or more processors determine the first area of the finger associated with the first portion of the fingerprint based on the first set of heatmaps; and determine a second set of heatmaps associated with the second touch input, wherein the one or more processors determine the second area of the finger associated with the second portion of the fingerprint based on the second set of heatmaps.

Example 15: The computing device of example 14, wherein the first set of heatmaps include one or more indications of capacitance values for a first region of the presence-sensitive display, and wherein the second set of heatmaps include one or more indications of capacitance values for a second region of the presence-sensitive display.

Example 16: The computing device of example 14 or 15, wherein the instructions further cause the one or more processors to: determine, based on the first set of heatmaps, whether at least one parameter of the first touch input satisfies a corresponding at least one threshold for the first touch input; and determine, based on the second set of heatmaps, whether at least one parameter of the second touch input satisfies a corresponding at least one threshold for the second touch input.

Example 17: The computing device of example 16, wherein the instructions further cause the one or more processors to: responsive to determining that the at least one parameter of the first touch input satisfies the corresponding at least one threshold for the first touch input, an indication of the first portion in the memory; and responsive to determining that the at least one parameter of the second touch input satisfies the corresponding at least one threshold for the second touch input, store an indication of the second portion in the memory.

Example 18: The computing device of example 16, wherein the instructions further cause the one or more processors to: responsive to determining that the at least one parameter of the first touch input does not satisfy the corresponding at least one threshold for the first touch input, output, for display by the presence-sensitive display, a graphical user interface including a guide for improving generation of the at least partial fingerprint; and responsive to determining that the at least one parameter of the second touch input does not satisfy the corresponding at least one threshold for the second touch input, output, for display by the presence-sensitive display, the graphical user interface including the guide.

Example 19: The computing device of any of examples 16 through 18, wherein the one or more processors receive the first portion of the fingerprint by receiving, from the fingerprint sensor, the first portion of the fingerprint in response to determining that the at least one parameter of the first touch input has stabilized, and wherein the one or more processors receive the second portion of the fingerprint by receiving, from the fingerprint sensor, the second portion of the fingerprint in response to the computing device determining that the at least one parameter of the second touch input has stabilized.

Example 20: The computing device of any of examples 16 through 19, wherein the at least one parameter of the first touch input includes one or more of a pressure exerted by the finger on the presence-sensitive display, a velocity of the finger, a shape of a contacting area of the finger, or a size of the contacting area of the finger, and wherein the at least one parameter of the second touch input includes one or more of the pressure exerted by the finger on the presence-sensitive display, the velocity of the finger, the shape of a contacting area of the finger, or the size of the contacting area of the finger.

Example 21: The computing device of any of examples 14 through 20, wherein the instructions further cause the one or more processors to change a gain value setting of the fingerprint sensor based on one or more of the first set of heatmaps or the second set of heatmaps.

Example 22: The computing device of any of examples 13 through 21, wherein the one or more processors determine the at least partial fingerprint by aligning the first portion of the fingerprint and the second portion of the fingerprint based on the first area of the finger and the second area of the finger.

Example 23: The computing device of any of examples 13 through 22, wherein the instructions further cause the one or more processors to output, for display by the presence-sensitive display, a graphical user interface including an indication of a first finger position for the finger at the first time, and an indication of a second finger position for the finger at the second time.

Example 24: The computing device of any of examples 13 through 23, wherein the finger is a first finger, and wherein the instructions further cause the one or more processors to: receive, from the presence-sensitive display, a current touch input of a second finger at a current time; while the presence-sensitive display is detecting the current touch input, receive, from the fingerprint sensor, a current portion of a fingerprint of the second finger; determine a current area of the second finger associated with the current portion of the fingerprint of the second finger; determine a reference portion of the at least partial fingerprint of the first finger corresponding to the current portion of the fingerprint of the second finger based on a current area of the second finger; and selectively authenticate a user by at least comparing the current portion of the fingerprint of the second finger to the reference portion of the at least partial fingerprint of the first finger.

Example 25: A non-transitory computer-readable storage medium encoded with instructions that, when executed by one or more processors of a computing device, cause the one or more processors to: a presence-sensitive display configured to detect touch input; a fingerprint sensor configured to obtain a fingerprint of a finger through the presence-sensitive display; one or more processors; and a memory that stores instructions that, when executed by the one or more processors, cause the one or more processors to: receive, from the presence-sensitive display, a first touch input of a finger at a first time; while the presence-sensitive display is detecting the first touch input, receive, from the fingerprint sensor, a first portion of the fingerprint of the finger; receive, from the presence-sensitive display, a second touch input of the finger at a second time; while the presence-sensitive display is detecting the second touch input, receive, from the fingerprint sensor, a second portion of the fingerprint of the finger; determine a first area of the finger associated with the first portion of the fingerprint and a second area of the finger associated with the second portion of the fingerprint; and generate an at least partial fingerprint of the finger based on the first portion of the fingerprint, the first area of the finger, the second portion of the fingerprint, and the second area of the finger.

Example 26: The non-transitory computer-readable storage medium of example 25, wherein the instructions cause the one or more processors to: determine a first set of heatmaps associated with the first touch input, wherein the one or more processors determine the first area of the finger associated with the first portion of the fingerprint based on the first set of heatmaps; and determine a second set of heatmaps associated with the second touch input, wherein the one or more processors determine the second area of the finger associated with the second portion of the fingerprint based on the second set of heatmaps.

Example 27: The non-transitory computer-readable storage medium of example 26, wherein the first set of heatmaps include one or more indications of capacitance values for a first region of the presence-sensitive display, and wherein the second set of heatmaps include one or more indications of capacitance values for a second region of the presence-sensitive display.

Example 28: The non-transitory computer-readable storage medium of example 26 or 27, wherein the instructions further cause the one or more processors to: determine, based on the first set of heatmaps, whether at least one parameter of the first touch input satisfies a corresponding at least one threshold for the first touch input; and determine, based on the second set of heatmaps, whether at least one parameter of the second touch input satisfies a corresponding at least one threshold for the second touch input.

Example 29: The non-transitory computer-readable storage medium of example 28, wherein the instructions further cause the one or more processors to: responsive to determining that the at least one parameter of the first touch input satisfies the corresponding at least one threshold for the first touch input, an indication of the first portion in the memory; and responsive to determining that the at least one parameter of the second touch input satisfies the corresponding at least one threshold for the second touch input, store an indication of the second portion in the memory.

Example 30: The non-transitory computer-readable storage medium of example 28, wherein the instructions further cause the one or more processors to: responsive to determining that the at least one parameter of the first touch input does not satisfy the corresponding at least one threshold for the first touch input, output, for display by the presence-sensitive display, a graphical user interface including a guide for improving generation of the at least partial fingerprint; and responsive to determining that the at least one parameter of the second touch input does not satisfy the corresponding at least one threshold for the second touch input, output, for display by the presence-sensitive display, the graphical user interface including the guide.

Example 31: The non-transitory computer-readable storage medium of any of examples 28 through 30, wherein the one or more processors receive the first portion of the fingerprint by receiving, from the fingerprint sensor, the first portion of the fingerprint in response to determining that the at least one parameter of the first touch input has stabilized, and wherein the one or more processors receive the second portion of the fingerprint by receiving, from the fingerprint sensor, the second portion of the fingerprint in response to the computing device determining that the at least one parameter of the second touch input has stabilized.

Example 32: The non-transitory computer-readable storage medium of any of examples 28 through 31, wherein the at least one parameter of the first touch input includes one or more of a pressure exerted by the finger on the presence-sensitive display, a velocity of the finger, a shape of a contacting area of the finger, or a size of the contacting area of the finger, and wherein the at least one parameter of the second touch input includes one or more of the pressure exerted by the finger on the presence-sensitive display, the velocity of the finger, the shape of a contacting area of the finger, or the size of the contacting area of the finger.

Example 33: The non-transitory computer-readable storage medium of any of examples 26 through 32, wherein the instructions further cause the one or more processors to change a gain value setting of the fingerprint sensor based on one or more of the first set of heatmaps or the second set of heatmaps.

Example 34: The computing device of any of examples 25 through 33, wherein the one or more processors determine the at least partial fingerprint by aligning the first portion of the fingerprint and the second portion of the fingerprint based on the first area of the finger and the second area of the finger.

Example 35: The computing device of any of examples 25 through 34, wherein the instructions further cause the one or more processors to output, for display by the presence-sensitive display, a graphical user interface including an indication of a first finger position for the finger at the first time, and an indication of a second finger position for the finger at the second time.

Example 36: The computing device of any of examples 25 through 35, wherein the finger is a first finger, and wherein the instructions further cause the one or more processors to: receive, from the presence-sensitive display, a current touch input of a second finger at a current time; while the presence-sensitive display is detecting the current touch input, receive, from the fingerprint sensor, a current portion of a fingerprint of the second finger; determine a current area of the second finger associated with the current portion of the fingerprint of the second finger; determine a reference portion of the at least partial fingerprint of the first finger corresponding to the current portion of the fingerprint of the second finger based on a current area of the second finger; and selectively authenticate a user by at least comparing the current portion of the fingerprint of the second finger to the reference portion of the at least partial fingerprint of the first finger.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
detecting, by a presence-sensitive display of a computing device, a first touch input of a finger at a first time;
while detecting the first touch input, obtaining, by a fingerprint sensor of the computing device, a first portion of a fingerprint of the finger, wherein the fingerprint sensor is configured to obtain the fingerprint through the presence-sensitive display;
determining, by the computing device, a first set of heatmaps associated with the first touch input;
detecting, by the presence-sensitive display, a second touch input of the finger at a second time;
changing a gain value setting of the fingerprint sensor based on the first set of heatmaps;
while detecting the second touch input, obtaining, by the fingerprint sensor, a second portion of the fingerprint of the finger;
determining, by the computing device, a first area of the finger associated with the first portion of the fingerprint and a second area of the finger associated with the second portion of the fingerprint; and
generating, by the computing device, an at least partial fingerprint of the finger based on the first portion of the fingerprint, the first area of the finger, the second portion of the fingerprint, and the second area of the finger.

2. The method of claim 1,
wherein determining the first area of the finger associated with the first portion of the fingerprint is based on the first set of heatmaps, the method further comprising:
determining, by the computing device, a second set of heatmaps associated with the second touch input, wherein determining the second area of the finger associated with the second portion of the fingerprint is based on the second set of heatmaps.

3. The method of claim 2,
wherein the first set of heatmaps include one or more indications of capacitance values for a first region of the presence-sensitive display, and
wherein the second set of heatmaps include one or more indications of capacitance values for a second region of the presence-sensitive display.

4. The method of claim 2, further comprising:
determining, by the computing device and based on the first set of heatmaps, whether at least one parameter of the first touch input satisfies a corresponding at least one threshold for the first touch input; and
determining, by the computing device and based on the second set of heatmaps, whether at least one parameter of the second touch input satisfies a corresponding at least one threshold for the second touch input.

5. The method of claim 4, further comprising:
responsive to determining that the at least one parameter of the first touch input satisfies the corresponding at least one threshold for the first touch input, storing, by the computing device, an indication of the first portion of the fingerprint in a memory of the computing device; and
responsive to determining that the at least one parameter of the second touch input satisfies the corresponding at least one threshold for the second touch input, storing, by the computing device, an indication of the second portion of the fingerprint in the memory.

6. The method of claim 4, further comprising:
responsive to determining that the at least one parameter of the first touch input does not satisfy the corresponding at least one threshold for the first touch input, outputting, by the computing device and for display by the presence-sensitive display, a graphical user interface including a guide for improving generation of the at least partial fingerprint; and
responsive to determining that the at least one parameter of the second touch input does not satisfy the corresponding at least one threshold for the second touch input, outputting, by the computing device and for display by the presence-sensitive display, the graphical user interface including the guide.

7. The method of claim 4,
wherein obtaining the first portion of the fingerprint is in response to the computing device determining that the at least one parameter of the first touch input has stabilized, and
wherein obtaining the second portion of the fingerprint is in response to the computing device determining that the at least one parameter of the second touch input has stabilized.

8. The method of claim 4,
wherein the at least one parameter of the first touch input includes one or more of a pressure exerted by the finger on the presence-sensitive display, a velocity of the finger, a shape of a contacting area of the finger, or a size of the contacting area of the finger, and wherein the at least one parameter of the second touch input includes one or more of the pressure exerted by the finger on the presence-sensitive display, the velocity of the finger, the shape of the contacting area of the finger, or the size of the contacting area of the finger.

9. The method of claim 2, wherein changing the gain value setting of the fingerprint sensor is further based on the second set of heatmaps.

10. The method of claim 1, wherein determining the at least partial fingerprint comprises aligning the first portion of the fingerprint and the second portion of the fingerprint based on the first area of the finger and the second area of the finger.

11. The method of claim 1, further comprising:

outputting, by the computing device and for display by the presence-sensitive display, a graphical user interface including an indication of a first finger position for the finger at the first time, and an indication of a second finger position for the finger at the second time.

12. The method of claim 1, wherein the finger is a first finger, the method further comprising:

detecting, by the presence-sensitive display, a current touch input of a second finger at a current time;

while detecting the current touch input, obtaining, by the fingerprint sensor, a current portion of a fingerprint of the second finger;

determining, by the computing device, a current area of the second finger associated with the current portion of the fingerprint of the second finger;

determining, based on the current area of the second finger, a reference portion of the at least partial fingerprint of the first finger corresponding to the current portion of the fingerprint of the second finger; and selectively authenticating, by the computing device, a user by at least comparing the current portion of the fingerprint of the second finger to the reference portion of the at least partial fingerprint of the first finger.

13. The method of claim 12, wherein selectively authenticating the user by at least comparing the current portion of the fingerprint of the second finger to the reference portion comprises using a machine learning algorithm to determine whether the current portion of the second finger matches the reference portion of the at least partial fingerprint.

14. A computing device comprising:

a memory that stores instructions;

a presence-sensitive display;

a fingerprint sensor; and one or more processors that execute the instructions to:

detect, with the presence-sensitive display, a first touch input of a finger at a first time;

while detecting the first touch input, obtain, with the fingerprint sensor, a first portion of a fingerprint of the finger, wherein the fingerprint sensor is configured to obtain the fingerprint through the presence-sensitive display;

determine a first set of heatmaps associated with the first touch input;

detect, with the presence-sensitive display, a second touch input of the finger at a second time;

change a gain value setting of the fingerprint sensor based on the first set of heatmaps;

while detecting the second touch input, obtain, with the fingerprint sensor, a second portion of the fingerprint of the finger;

determine a first area of the finger associated with the first portion of the fingerprint and a second area of the finger associated with the second portion of the fingerprint; and generate an at least partial fingerprint of the finger based on the first portion of the fingerprint, the first area of the finger, the second portion of the fingerprint, and the second area of the finger.

15. The computing device of claim 14, wherein the one or more processors execute the instructions to:

determine the first area of the finger associated with the first portion of the fingerprint based on the first set of heatmaps;

determine a second set of heatmaps associated with the second touch input; and determine the second area of the finger associated with the second portion of the fingerprint based on the second set of heatmaps.

16. The computing device of claim 15, wherein the first set of heatmaps include one or more indications of capacitance values for a first region of the presence-sensitive display, and wherein the second set of heatmaps include one or more indications of capacitance values for a second region of the presence-sensitive display.

17. The computing device of claim 15, wherein the one or more processors execute the instructions to:

determine, based on the first set of heatmaps, whether at least one parameter of the first touch input satisfies a corresponding at least one threshold for the first touch input; and determine, based on the second set of heatmaps, whether at least one parameter of the second touch input satisfies a corresponding at least one threshold for the second touch input.

18. The computing device of claim 17, wherein the one or more processors execute the instructions to:

responsive to determining that the at least one parameter of the first touch input satisfies the corresponding at least one threshold for the first touch input, store an indication of the first portion of the fingerprint in a memory of the computing device; and responsive to determining that the at least one parameter of the second touch input satisfies the corresponding at least one threshold for the second touch input, store an indication of the second portion of the fingerprint in the memory.

19. The computing device of claim 17, wherein the one or more processors execute the instructions to:

responsive to determining that the at least one parameter of the first touch input does not satisfy the corresponding at least one threshold for the first touch input, output, for display by the presence-sensitive display, a graphical user interface including a guide for improving generation of the at least partial fingerprint; and responsive to determining that the at least one parameter of the second touch input does not satisfy the corresponding at least one threshold for the second touch input, output, for display by the presence-sensitive display, the graphical user interface including the guide.

20. Non-transitory computer-readable storage media comprising instructions that, when executed by one or more processors of a computing device, cause the one or more processors to:

detect, with a presence-sensitive display of the computing device, a first touch input of a finger at a first time;

while detecting the first touch input, obtain, with a fingerprint sensor of the computing device, a first portion of a fingerprint of the finger, wherein the fingerprint sensor is configured to obtain the fingerprint through the presence-sensitive display;

determine a first set of heatmaps associated with the first touch input;

detect, with the presence-sensitive display, a second touch input of the finger at a second time;

change a gain value setting of the fingerprint sensor based on the first set of heatmaps;

while detecting the second touch input, obtain, with the fingerprint sensor, a second portion of the fingerprint of the finger;

determine a first area of the finger associated with the first portion of the fingerprint and a second area of the finger associated with the second portion of the fingerprint; and generate an at least partial fingerprint of the finger based on the first portion of the fingerprint, the first area of the finger, the second portion of the fingerprint, and the second area of the finger.

\* \* \* \* \*